US011705121B2

(12) United States Patent
Bhaya et al.

(10) Patent No.: US 11,705,121 B2
(45) Date of Patent: *Jul. 18, 2023

(54) MULTIMODAL TRANSMISSION OF PACKETIZED DATA

(71) Applicant: Google LLC, Mountain View, CA (US)

(72) Inventors: Gaurav Bhaya, Sunnyvale, CA (US); Robert Stets, Mountain View, CA (US); Umesh Patil, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 329 days.

This patent is subject to a terminal disclaimer.

(21) Appl. No.: 16/936,972

(22) Filed: Jul. 23, 2020

(65) Prior Publication Data
US 2020/0357402 A1 Nov. 12, 2020

Related U.S. Application Data

(63) Continuation of application No. 16/666,780, filed on Oct. 29, 2019, now Pat. No. 10,748,541, which is a
(Continued)

(51) Int. Cl.
*G10L 15/00* (2013.01)
*G10L 15/22* (2006.01)
(Continued)

(52) U.S. Cl.
CPC .............. *G10L 15/22* (2013.01); *G06F 3/167* (2013.01); *G06F 40/279* (2020.01);
(Continued)

(58) Field of Classification Search
CPC ... G10L 15/22; G10L 2015/223; G10L 15/30; G10L 15/265; G10L 15/02; G10L 17/22;
(Continued)

(56) References Cited

U.S. PATENT DOCUMENTS 5,675,788 A 10/1997 Husick et al.
5,724,521 A 3/1998 Dedrick
(Continued)

FOREIGN PATENT DOCUMENTS

CN 102016502 4/2011
CN 104396287 3/2015
(Continued)

OTHER PUBLICATIONS

W. Mueller, R. Schaefer and S. Bleul, "Interactive multimodal user interfaces for mobile devices," 37th Annual Hawaii International Conference on System Sciences, 2004. Proceedings of the, 2004, pp. 10 (Year: 2004).*

(Continued)

*Primary Examiner* — Edgar X Guerra-Erazo
(74) *Attorney, Agent, or Firm* — Dority & Manning, P.A.

(57) ABSTRACT

A system of multi-modal transmission of packetized data in a voice activated data packet based computer network environment is provided. A natural language processor component can parse an input audio signal to identify a request and a trigger keyword. Based on the input audio signal, a direct action application programming interface can generate a first action data structure, and a content selector component can select a content item. An interface management component can identify first and second candidate interfaces, and respective resource utilization values. The interface management component can select, based on the resource utilization values, the first candidate interface to present the content item. The interface management component can provide the first action data structure to the client computing device for rendering as audio output, and can transmit the content item converted for a first modality to deliver the content item for rendering from the selected interface.

20 Claims, 5 Drawing Sheets

Related U.S. Application Data continuation of application No. 16/039,204, filed on Jul. 18, 2018, now Pat. No. 10,593,329, which is a continuation-in-part of application No. 15/395,703, filed on Dec. 30, 2016, now Pat. No. 10,032,452.

(51) Int. Cl.
  *G06F 3/16* (2006.01)
  *G06F 40/279* (2020.01)
  *G10L 15/18* (2013.01)
  *G10L 15/08* (2006.01)

(52) U.S. Cl.
  CPC .... *G10L 15/1822* (2013.01); *G10L 2015/088* (2013.01); *G10L 2015/223* (2013.01)

(58) Field of Classification Search
  CPC ......... G10L 15/32; G10L 15/00; G10L 25/51; G10L 25/54; G10L 15/222
  See application file for complete search history.

(56) References Cited

U.S. PATENT DOCUMENTS

| | | |
|---|---|---|
| 5,740,549 A | 4/1998 | Reilly et al. |
| 5,749,069 A | 5/1998 | Komori et al. |
| 5,848,397 A | 12/1998 | Marsh et al. |
| 5,850,433 A | 12/1998 | Rondeau |
| 5,930,773 A | 7/1999 | Crooks et al. |
| 5,948,061 A | 9/1999 | Merriman et al. |
| 6,026,368 A | 2/2000 | Brown et al. |
| 6,044,376 A | 3/2000 | Kurtzman, II |
| 6,078,914 A | 6/2000 | Redfern |
| 6,088,688 A | 7/2000 | Crooks et al. |
| 6,125,284 A | 9/2000 | Moore et al. |
| 6,144,944 A | 11/2000 | Kurtzman et al. |
| 6,167,382 A | 12/2000 | Sparks et al. |
| 6,189,003 B1 | 2/2001 | Leal |
| 6,259,127 B1 | 7/2001 | Pan |
| 6,259,405 B1 | 7/2001 | Stewart et al. |
| 6,269,361 B1 | 7/2001 | Davis et al. |
| 6,275,806 B1 | 8/2001 | Pertrushin |
| 6,332,127 B1 | 12/2001 | Bandera et al. |
| 6,401,075 B1 | 6/2002 | Mason et al. |
| 6,446,045 B1 | 9/2002 | Stone et al. |
| 6,600,930 B1 | 7/2003 | Sakurai et al. |
| 6,647,257 B2 | 11/2003 | Owensby |
| 6,665,293 B2 | 12/2003 | Thornton et al. |
| 6,677,894 B2 | 1/2004 | Sheynblat et al. |
| 6,684,249 B1 | 1/2004 | Frerichs et al. |
| 6,731,612 B1 | 5/2004 | Koss |
| 6,857,007 B1 | 2/2005 | Bloomfield |
| 6,956,816 B1 | 10/2005 | Alexander et al. |
| 6,983,331 B1 | 1/2006 | Mitchell et al. |
| 6,985,882 B1 | 1/2006 | Del Sesto |
| 7,016,343 B1 | 3/2006 | Mermel et al. |
| 7,039,599 B2 | 5/2006 | Merriman et al. |
| 7,120,235 B2 | 10/2006 | Altberg et al. |
| 7,136,875 B2 | 11/2006 | Anderson et al. |
| 7,240,025 B2 | 7/2007 | Stone et al. |
| 7,376,640 B1 | 5/2008 | Anderson et al. |
| 7,406,434 B1 | 7/2008 | Chang et al. |
| 7,613,637 B2 | 11/2009 | Chan et al. |
| 7,668,950 B2 | 2/2010 | Horowitz et al. |
| 7,853,255 B2 | 12/2010 | Karaoguz et al. |
| 7,881,936 B2 | 2/2011 | Longe et al. |
| 7,904,460 B2 | 3/2011 | Armour et al. |
| 7,920,682 B2 | 4/2011 | Byrne et al. |
| 8,041,709 B2 | 10/2011 | Permandala et al. |
| 8,068,604 B2 | 11/2011 | Leeds et al. |
| 8,108,383 B2 | 1/2012 | Lin et al. |
| 8,175,914 B1 | 5/2012 | Benson et al. |
| 8,195,133 B2 | 6/2012 | Ramer et al. |
| 8,204,881 B2 | 6/2012 | Holt et al. |
| 8,214,342 B2 | 7/2012 | Meiresonne |
| 8,234,275 B2 | 7/2012 | Grant et al. |
| 8,312,014 B2 | 11/2012 | Lu et al. |
| 8,326,637 B2 | 12/2012 | Baldwin et al. |
| 8,386,386 B1 | 2/2013 | Zhu |
| 8,453,058 B1 | 5/2013 | Coccaro et al. |
| 8,612,226 B1 | 12/2013 | Epstein et al. |
| 8,762,156 B2 | 6/2014 | Chen |
| 8,903,716 B2 | 12/2014 | Chen et al. |
| 9,153,106 B1 | 10/2015 | Kuscher et al. |
| 9,275,637 B1 | 3/2016 | Salvador et al. |
| 9,318,107 B1 | 4/2016 | Sharifi |
| 9,424,841 B2 | 8/2016 | Foerster et al. |
| 9,431,006 B2 | 8/2016 | Bellegarda |
| 9,542,941 B1 | 1/2017 | Weksler et al. |
| 9,653,075 B1 | 5/2017 | Chen et al. |
| 10,032,452 B1* | 7/2018 | Bhaya ................. G10L 15/1822 |
| 10,165,091 B1 | 12/2018 | Bittfield et al. |
| 10,193,465 B2 | 1/2019 | Dai et al. |
| 10,535,348 B2* | 1/2020 | Bhaya ..................... G10L 15/14 |
| 10,593,329 B2* | 3/2020 | Bhaya ................... G06F 40/279 |
| 10,748,541 B2* | 8/2020 | Bhaya ................... G06F 40/279 |
| 2001/0020236 A1 | 9/2001 | Cannon |
| 2001/0025275 A1 | 9/2001 | Tanaka et al. |
| 2002/0029226 A1 | 3/2002 | Li et al. |
| 2002/0042829 A1 | 4/2002 | Mizuhara et al. |
| 2002/0077130 A1 | 6/2002 | Owensby |
| 2002/0082938 A1 | 6/2002 | Borger et al. |
| 2002/0091571 A1 | 7/2002 | Thomas et al. |
| 2002/0128908 A1 | 9/2002 | Levin et al. |
| 2002/0161646 A1 | 10/2002 | Gailey et al. |
| 2002/0164977 A1 | 11/2002 | Link, II et al. |
| 2002/0188680 A1 | 12/2002 | Mccormack et al. |
| 2003/0008661 A1 | 1/2003 | Joyce et al. |
| 2003/0018479 A1 | 1/2003 | Oh et al. |
| 2003/0028529 A1 | 2/2003 | Cheung et al. |
| 2003/0032406 A1 | 2/2003 | Minear et al. |
| 2003/0032409 A1 | 2/2003 | Hutcheson et al. |
| 2003/0033079 A1 | 2/2003 | Endicott |
| 2003/0033292 A1 | 2/2003 | Meisel et al. |
| 2003/0046161 A1 | 3/2003 | Kamangar et al. |
| 2003/0061211 A1 | 3/2003 | Shultz et al. |
| 2003/0081594 A1 | 5/2003 | Lee |
| 2003/0105677 A1 | 6/2003 | Skinner |
| 2003/0125977 A1 | 7/2003 | Morioka et al. |
| 2003/0154072 A1 | 8/2003 | Young et al. |
| 2003/0220835 A1 | 11/2003 | Barnes, Jr. |
| 2004/0023666 A1 | 2/2004 | Moon et al. |
| 2004/0030556 A1 | 2/2004 | Bennett |
| 2004/0043770 A1 | 3/2004 | Amit et al. |
| 2004/0044565 A1 | 3/2004 | Kumar et al. |
| 2004/0044571 A1 | 3/2004 | Bronnimann et al. |
| 2004/0059712 A1 | 3/2004 | Dean et al. |
| 2004/0076279 A1 | 4/2004 | Taschereau |
| 2004/0083133 A1 | 4/2004 | Nicholas et al. |
| 2004/0085894 A1 | 5/2004 | Wang et al. |
| 2004/0120323 A1 | 6/2004 | Viikari et al. |
| 2004/0172389 A1 | 9/2004 | Galai et al. |
| 2004/0220778 A1 | 11/2004 | Imai et al. |
| 2005/0027659 A1 | 2/2005 | Kumar et al. |
| 2005/0065999 A1 | 3/2005 | Acharya et al. |
| 2005/0074102 A1 | 4/2005 | Altberg et al. |
| 2005/0076017 A1 | 4/2005 | Rein et al. |
| 2005/0086104 A1 | 4/2005 | Mcfadden |
| 2005/0097204 A1 | 5/2005 | Horowitz et al. |
| 2005/0137939 A1 | 6/2005 | Calabria et al. |
| 2005/0144065 A1 | 6/2005 | Calabria et al. |
| 2005/0144069 A1 | 6/2005 | Wiseman et al. |
| 2005/0187823 A1 | 8/2005 | Howes |
| 2005/0225810 A1 | 10/2005 | Sun |
| 2005/0234879 A1 | 10/2005 | Zeng et al. |
| 2006/0004627 A1 | 1/2006 | Baluja |
| 2006/0149624 A1 | 7/2006 | Baluja et al. |
| 2006/0190974 A1 | 8/2006 | Lee |
| 2006/0195819 A1 | 8/2006 | Chory et al. |
| 2006/0247913 A1 | 11/2006 | Huerta et al. |
| 2006/0274869 A1 | 12/2006 | Morse |
| 2006/0287919 A1 | 12/2006 | Rubens et al. |
| 2007/0005570 A1 | 1/2007 | Hurst-Hiller et al. |
| 2007/0088609 A1 | 4/2007 | Reller et al. |

(56) References Cited

U.S. PATENT DOCUMENTS

| | | |
|---|---|---|
| 2007/0097975 A1 | 5/2007 | Rakers et al. |
| 2007/0100822 A1 | 5/2007 | Freeman et al. |
| 2007/0127688 A1 | 6/2007 | Doulton |
| 2007/0282612 A1 | 12/2007 | Kaneko et al. |
| 2007/0294229 A1 | 12/2007 | Au |
| 2008/0021604 A1 | 1/2008 | Bouvier et al. |
| 2008/0021792 A1 | 1/2008 | Steelberg et al. |
| 2008/0049696 A1 | 2/2008 | Stewart |
| 2008/0052219 A1 | 2/2008 | Sandholm et al. |
| 2008/0071536 A1 | 3/2008 | Nagashima |
| 2008/0103781 A1 | 5/2008 | Wasson et al. |
| 2008/0227484 A1 | 9/2008 | Auvray et al. |
| 2008/0228494 A1 | 9/2008 | Cross |
| 2008/0243785 A1 | 10/2008 | Stading |
| 2008/0249855 A1 | 10/2008 | Collins et al. |
| 2008/0270223 A1 | 10/2008 | Collins et al. |
| 2008/0270224 A1 | 10/2008 | Portman et al. |
| 2008/0294609 A1 | 11/2008 | Liu et al. |
| 2008/0305778 A1 | 12/2008 | Aaltonen et al. |
| 2009/0006145 A1 | 1/2009 | Duggal et al. |
| 2009/0013255 A1 | 1/2009 | Yuschik et al. |
| 2009/0210491 A1 | 8/2009 | Thakkar et al. |
| 2009/0228281 A1 | 9/2009 | Singleton et al. |
| 2009/0240670 A1 | 9/2009 | Tiyyagura et al. |
| 2010/0114944 A1 | 5/2010 | Adler et al. |
| 2010/0138416 A1 | 6/2010 | Bellotti |
| 2010/0198772 A1 | 8/2010 | Silverman et al. |
| 2010/0306229 A1 | 12/2010 | Timm et al. |
| 2011/0010240 A1 | 1/2011 | Veach |
| 2011/0014925 A1 | 1/2011 | Antic et al. |
| 2011/0022460 A1 | 1/2011 | Bhatia et al. |
| 2011/0087660 A1 | 4/2011 | Yu et al. |
| 2011/0141925 A1 | 6/2011 | Velenko et al. |
| 2011/0177799 A1 | 7/2011 | Ramer et al. |
| 2011/0202494 A1 | 8/2011 | Shin et al. |
| 2011/0264644 A1 | 10/2011 | Grant et al. |
| 2011/0295682 A1 | 12/2011 | Liu |
| 2011/0295990 A1 | 12/2011 | St. Jean et al. |
| 2011/0307436 A1 | 12/2011 | Cai et al. |
| 2011/0320114 A1 | 12/2011 | Buxton et al. |
| 2012/0016897 A1 | 1/2012 | Tulumbas et al. |
| 2012/0030015 A1 | 2/2012 | Brunsman et al. |
| 2012/0036226 A1 | 2/2012 | Chor |
| 2012/0054613 A1 | 3/2012 | Yoo et al. |
| 2012/0101776 A1 | 4/2012 | Brower et al. |
| 2012/0102020 A1 | 4/2012 | Pearson |
| 2012/0102087 A1 | 4/2012 | Chor |
| 2012/0138671 A1 | 6/2012 | Gaede et al. |
| 2012/0155838 A1 | 6/2012 | Gerhards et al. |
| 2012/0158954 A1 | 6/2012 | Heffernan et al. |
| 2012/0166277 A1 | 6/2012 | Gnanamani et al. |
| 2012/0221724 A1 | 8/2012 | Chor |
| 2012/0265528 A1 | 10/2012 | Gruber et al. |
| 2012/0297174 A1 | 11/2012 | Frank et al. |
| 2013/0013749 A1 | 1/2013 | Kane et al. |
| 2013/0073400 A1 | 3/2013 | Heath |
| 2013/0117022 A1 | 5/2013 | Chen et al. |
| 2013/0124606 A1 | 5/2013 | Carpenter et al. |
| 2013/0144720 A1 | 6/2013 | Hari et al. |
| 2013/0185074 A1 | 7/2013 | Gruber et al. |
| 2013/0191226 A1 | 7/2013 | Smallwood et al. |
| 2013/0275164 A1 | 10/2013 | Gruber et al. |
| 2013/0304758 A1 | 11/2013 | Gruber et al. |
| 2013/0304789 A1 | 11/2013 | Herlein |
| 2013/0325449 A1 | 12/2013 | Levien et al. |
| 2013/0339030 A1 | 12/2013 | Ehsani et al. |
| 2014/0074895 A1 | 3/2014 | Ingerman et al. |
| 2014/0095583 A1 | 4/2014 | Houle |
| 2014/0115635 A1 | 4/2014 | Mashimo |
| 2014/0222436 A1 | 8/2014 | Binder et al. |
| 2014/0229184 A1 | 8/2014 | Shires |
| 2014/0337028 A1 | 11/2014 | Wang et al. |
| 2014/0350938 A1 | 11/2014 | Schroeter |
| 2015/0081288 A1 | 3/2015 | Kim |
| 2015/0106085 A1 | 4/2015 | Lindahl |
| 2015/0221305 A1 | 8/2015 | Sharifi |
| 2016/0012686 A1 | 1/2016 | Kuscher et al. |
| 2016/0077710 A1 | 3/2016 | Lewis et al. |
| 2016/0105718 A1 | 4/2016 | Xu et al. |
| 2016/0118044 A1 | 4/2016 | Bondarev et al. |
| 2016/0180846 A1 | 6/2016 | Lee |
| 2016/0217790 A1 | 7/2016 | Sharifi |
| 2016/0223640 A1 | 8/2016 | Vilermo et al. |
| 2016/0246929 A1 | 8/2016 | Zenati et al. |
| 2016/0259497 A1 | 9/2016 | Foss et al. |
| 2017/0069317 A1 | 3/2017 | Kwon |
| 2017/0092278 A1 | 3/2017 | Evermann et al. |
| 2017/0110130 A1 | 4/2017 | Sharifi et al. |
| 2017/0110144 A1 | 4/2017 | Sharifi et al. |
| 2017/0132019 A1 | 5/2017 | Karashchuk et al. |
| 2017/0147585 A1 | 5/2017 | Kleindienst et al. |
| 2017/0236524 A1 | 8/2017 | Ray et al. |
| 2017/0289596 A1 | 10/2017 | Krasadakis et al. |
| 2017/0358301 A1 | 12/2017 | Raitio et al. |
| 2017/0358302 A1 | 12/2017 | Orr et al. |
| 2018/0107445 A1 | 4/2018 | Ohmura |
| 2018/0322536 A1 | 11/2018 | Zhang et al. |

FOREIGN PATENT DOCUMENTS

| | | |
|---|---|---|
| CN | 104683294 | 5/2015 |
| CN | 105849758 | 8/2016 |
| EP | 1 271 458 | 1/2003 |
| EP | 1 286 288 | 2/2003 |
| GB | 2 305 747 | 4/1997 |
| JP | 11-065950 A | 3/1999 |
| JP | 11-265347 | 9/1999 |
| JP | 2001-236410 | 8/2001 |
| JP | 2001-282982 A | 10/2001 |
| JP | 2001-297256 A | 10/2001 |
| JP | 2001-312646 | 11/2001 |
| JP | 2001-312649 | 11/2001 |
| JP | 2002-007253 | 1/2002 |
| JP | 2002-016970 | 1/2002 |
| JP | 2002-073666 | 3/2002 |
| JP | 2002-099822 | 4/2002 |
| JP | 2002-132827 | 5/2002 |
| JP | 2002-140359 | 5/2002 |
| JP | 2002-169744 | 6/2002 |
| JP | 2002-170027 | 6/2002 |
| JP | 2002-245048 | 8/2002 |
| JP | 2002-288541 A | 10/2002 |
| JP | 2003-016348 | 1/2003 |
| JP | 2003-122781 A | 4/2003 |
| JP | 2003-223591 | 8/2003 |
| JP | 2003-263584 A | 9/2003 |
| JP | 2003-337893 | 11/2003 |
| JP | 2004-032037 | 1/2004 |
| JP | 2006-236324 A | 9/2006 |
| JP | 2011-192102 | 3/2010 |
| JP | 2013-540306 A | 10/2013 |
| JP | 2015-001815 A | 1/2015 |
| JP | 2016-111406 A | 6/2016 |
| KR | 2000-0054165 A | 9/2000 |
| KR | 200054165 A | 9/2000 |
| KR | 2002-69767 A | 9/2002 |
| KR | 2003-39736 A | 5/2003 |
| KR | 2010-0126796 A | 12/2010 |
| KR | 10-2015-0092996 A | 8/2015 |
| KR | 2015-0097816 A | 8/2015 |
| WO | WO-97/21183 A | 6/1997 |
| WO | WO-00/42544 | 7/2000 |
| WO | WO-01/59546 A2 | 8/2001 |
| WO | WO-01/93138 | 12/2001 |
| WO | WO-2012/094329 | 7/2012 |
| WO | WO-2014/004489 A1 | 1/2014 |
| WO | WO-2015/133022 A1 | 9/2015 |

OTHER PUBLICATIONS

Final Office Action for U.S. Appl. No. 16/266,927 dated Dec. 1, 2020 (8 pages).

(56) References Cited

OTHER PUBLICATIONS

Non-Final Office Action for U.S. Appl. No. 15/587,132 dated Jan. 26, 2021 (18 pages).
Non-Final Office Action for U.S. Appl. No. 15/638,291 dated Nov. 12, 2020 (24 pages).
First Office Action for CN Appln. Ser. No. 201780001651.4 dated Mar. 31, 2021 (27 pages).
Examination Report for AU Appln. Ser. No. 2020217377 dated Jul. 7, 2021 (2 pages).
Final Office Action for U.S. Appl. No. 15/638,295 dated Jul. 21, 2021 (26 pages).
Non-Final Office Action for U.S. Appl. No. 16/266,927 dated Jul. 22, 2021 (8 pages).
Final Office Action for U.S. Appl. No. 15/584,970 dated Jun. 25, 2021 (17 pages).
Final Office Action for U.S. Appl. No. 15/587,132 dated Jun. 25, 2021 (18 pages).
Zhang, "Information Security Technology: vol. 1 (Second Edition)", University of Electronic Science and Technology Press, 2015, pp. 158-161.
Machine Translated Chinese Search Report Corresponding to Application No. 201780001651 dated Aug. 31, 2017.
Examination Report for IN Appln. Ser. No. 201747040182 dated Aug. 12, 2020 (7 pages).
Non-Final Office Action for U.S. Appl. No. 15/638,295 dated Oct. 15, 2020 (30 pages).
Flinn et al., "Balancing Performance, Energy, and Quality in Pervasive Computing", Proceedings of the 22nd International Conference on Distributed Computing Systems, IEEE, 2002, Vienna, Austria, pp. 1-10 (10 pages).
Non-Final Office Action for U.S. Appl. No. 15/584,970 dated Feb. 23, 2021 (16 pages).
Non-Final Office Action for U.S. Appl. No. 16/696,622 dated Mar. 4, 2021 (9 pages).
U.S. Appl. No. 95/001,061, filed Jul. 7, 2008.
U.S. Appl. No. 95/001,068, filed Jul. 14, 2008.
U.S. Appl. No, 95/001,069, filed Jul. 21, 2008.
U.S. Appl. No. 95/001,073, filed Jul. 30, 2008.
"10 Tips to Improve the Performance of Google Product Listing Ads", Foghorn Labs, retrieved Mar. 18, 2013 from URL: http://www.foghornlabs.com/2012/11/21/product-listing-ads-best-practices/ (5 pages).
"Best Practices for Creating Adaptive User Interfaces with the Mobile Internet Toolkit", Microsoft Corporation, Jan. 2002 (16 pages).
"Chapter 12, Managing the Product, Class Notes", University of Delaware, http://www.udel.edu/alex/chapt12.html, accessed Mar. 13, 2015 (10 pages).
"'Dolphin' attacks fool Amazon, Google voice assistants", BBC News, Sep. 7, 2017 (8 pages).
"EStara Push to Talk: The most popular click to call service in the world," downloaded from http://www.estara.com on Jun. 29, 20014 (2 pages).
"Google Assistant SDK", Google Developers Newsletter, Google Developers, developers.google.com, accessed on Jul. 12, 2017 (2 pages).
"Products Feed Specification", Google Merchant Center Help, Google, Inc., retrieved Mar. 18, 2013 from URL: http://www.support.google.com/merchants/bin/answer.py?hl=en&answer=188494#US (6 pages).
"Supported File Formats", Google Merchant Center Help, Google, Inc., retrieved Mar. 18, 2013 from URL: http://www.support.google.com/merchants/bin/answer.py?hl=en&answer=160567 (1 page).
"Walmart and Google to offer voice-enabled shopping", BBC News, Aug. 23, 2017 (10 pages).
"Wiley Encyclopedia of Computer Science and Engineering: vol. I", Wiley-Interscience, Nov. 2008 (2365 pages).
95/001,061 Reexamination—Miscellaneous Action dated Jul. 2, 2013 (4 pages).
95/001,061 Reexamination—Reexamination Terminated dated Jul. 2, 2013 (4 pages).
95/001,068 Reexamination—"Certificate of Service" dated Mar. 24, 2012 (1 page).
95/001,068 Reexamination—"Inter Partes Reexamination Certificate" for 6829587-C1 dated Jan. 8, 2013 (2 pages).
95/001,068 Reexamination—Appeal No. 2011-013241, "Decision on Appeal" dated Jan. 27, 2012 (34 pages).
95/001,068 Reexamination—Appeal No. 2011-013241, "Notice of Appeal" dated Mar. 24, 2012 (3 pages).
95/001,068 Reexamination—Case 12-1379, Document 20, "Order" by the US Court of Appeals for the Federal Circuit dated Sep. 6, 2012 (2 pages).
95/001,069 Reexamination—"Certificate of Service" dated Mar. 24, 2012 (1 page).
95/001,069 Reexamination—"Inter Partes Reexamination Certificate" for U.S. Pat. No. 7,249,059-C1 dated Jul. 23, 2013 (2 pages).
95/001,069 Reexamination—Appeal No. 2011-010893, "Decision on Appeal" dated Jan. 27, 2012 (34 pages).
95/001,069 Reexamination—Appeal No. 2011-010893, "Notice of Appeal" dated Mar. 24, 2012 (3 pages).
95/001,069 Reexamination—Case 12-1380, Document 54-1, Decision by the US Court of Appeals for the Federal Circuit dated Mar. 7, 2013 (8 pages).
95/001,069 Reexamination—Case 12-1380, Document 54-2, "Information Sheet" dated Mar. 7, 2013 (1 page).
95/001,069 Reexamination—Case 12-1380, Document 54-3, "Questions and Answers: Petitions for Panel Rehearing (Fed. Cir. R. 40) and Petitions for Hearing or Rehearing En Banc (Fed. Cir. R. 35)" dated Mar. 7, 2013 (1 page).
95/001,069 Reexamination—Case 12-1380, Document 54-4, "Notice of Entry of Judgment Accompanied by Opinion" dated Mar. 7, 2013 (2 pages).
95/001,069 Reexamination—Case 12-1380, Document 55-3, "Mandate" dated Apr. 29, 2013 (2 pages).
95/001,073 Reexamination—"Certificate of Service" dated Mar. 24, 2012 (1 page).
95/001,073 Reexamination—"Inter Partes Reexamination Certificate" for U.S. Pat. No. 7,240,025-C1 dated Jul. 23, 2013 (2 pages).
95/001,073 Reexamination—Appeal No. 2011-010719, "Decision on Appeal" dated Jan. 27, 2012 (27 pages).
95/001,073 Reexamination—Appeal No. 2011-010719, "Notice of Appeal" dated Mar. 24, 2012 (3 pages).
95/001,073 Reexamination—Case 12-1380, Document 54-1, Decision by the US Court of Appeals for the Federal Circuit dated Mar. 7, 2013 (8 pages).
95/001,073 Reexamination—Case 12-1380, Document 55-3, "Mandate" by the US Court of Appeals for the Federal Circuit dated Apr. 29, 2013 (2 pages).
Abrams, Brad, "Help users find, interact & re-engage with your app on the Google Assistant", Google Developers Blog, Nov. 15, 2017 (16 pages).
AdForce, Inc., "AdForce User Guide, Version 2.6", 1998 (285 pages).
AdForce, Inc., "S-1/A SEC Filing," EDGAR Online, Appendix F2, May 6, 1999 (9 pages).
AdKnowledge, "Reviewer's Guide", Campaign Manager: Part of the AdKnowledge System, Appendix E1, Aug. 1998 (23 pages).
AdKnowledge, "Reviewer's Guide", MarketMatch Planner, Appendix E2, May 1998 (26 pages).
Ad-Star.com website archive from www.Archive.org, Apr. 12, 1997 and Feb. 1, 1997 (43 pages).
Albrecht, Chris, "Alexa, How Can You Be Used in Restaurants?", The Spoon, Dec. 10, 2017 (6 pages).
Amazon, "Echo Look | Hands-Free Camera and Style Assistant", retrieved Aug. 22, 2017 from URL: https://www.amazon.com/gp/product/B0186JAEWK?ref%5F=cm%5Fsw%5Fr%5Ffa%5Fdp%5Ft2%5FC5oazbJTKCB18&pldnSite=1 (7 pages).
AU 2005259861, "Statement of Grounds and Particulars in Support of Opposition" dated Jan. 22, 2010 (13 pages).
Barr, Jeff, "AWS DeepLens—Get Hands-On Experience with Deep Learning With Our New Video Camera", AWS News Blog, Nov. 29, 2017 (11 pages).

(56) References Cited

OTHER PUBLICATIONS

Baseview Products, Inc., "AdManagerPro Administrator's Manual v. 2.0", Appendix H, Dec. 1998 (226 pages).
Baseview Products, Inc., "ClassManagerPro Administration Manual v. 1.0.5", Feb. 1, 1997 (157 pages).
Broussard, Mitchel, "Chatbot-Like Siri Patent Includes Intelligent Image, Video, and Audio Recognition Within Messages", Mac Rumors, May 11, 2017, retrieved Jul. 12, 2017 from URL: https://www.macrumors.com/2017/05/11/siri-chatbot-like-patent/ (11 pages).
Buckland et al., "Amazon's Alexa Takes Open-Source Route to Beat Google Into Cars", Bloomberg, Feb. 27, 2018 (6 pages).
Business Wire, Inc., "Global Network, Inc. Enters Into Agreement in Principle With Major Advertising Agency," dated Oct. 1, 1999 (2 pages).
Chen, Lulu Yilun, "Alibaba Challenges Google, Amazon With New Echo-Like Device", Bloomberg, Jul. 5, 2017, retrieved Jul. 12, 2017 from URL: https://www.bloomberg.com/news/articles/2017-07-05/alibaba-challenges-google-amazon-with-new-echo-like-device (3 pages).
Close, Kerry, "Amazon Echo Will Give You These Deals If You Order Through Alexa This Weekend," Time.com, Nov. 18, 2016 (2 pages).
Clover, Juli, "Amazon and Google Want to Turn Their Smart Home Speakers Into Telephone Replacements", MacRumors, Feb. 15, 2017 (5 pages).
Coberly, Cohen, "Apple patent filing reveals potential whispering Siri functionality", Techspot, Dec. 14, 2017 (4 pages).
Collins, et al., "Can Twitter Save Itself?", CNET, Apr. 26, 2017, retrieved Aug. 22, 2017 from URL: https://www.cnet.com/news/twitter-q1-2017-earnings/ (3 pages).
Cook, John, "A Siri for advertising: These mobile ads talk back to you," GeekWire, Apr. 1, 2013, geekwire.com (7 pages).
Corrected Notice of Allowance for U.S. Appl. No. 15/395,703 dated May 17, 2018 (5 pages).
Crist, Ry, "Logitech Harmony's Alexa skill just got a whole lot better", CNET, Jul. 13, 2017 (2 pages).
Decision of Rejection for JP Appln. Ser. No. 2007-519374 dated Jun. 15, 2010 (6 pages).
Decision of Rejection for JP Appln. Ser. No. 2007-519407 dated Feb. 23, 2010 (5 pages).
Decision of Rejection for JP Appln. Ser. No. 2010-232591 dated Jan. 27, 2014 (4 pages).
Decision to Dismiss the Amendment for KR Appln. Ser. No. 10-2007-7002383 dated Jul. 9, 2010 (3 pages).
Dedrick, Rick, "A Consumption Model for Targeted Electronic Advertising," Intel Architecture Labs, IEEE MultiMedia, dated 1995 (9 pages).
Dedrick, Rick, "Interactive Electronic Advertising", Intel Corp. Media Delivery Lab, IEEE, dated 1994 (12 pages).
Dickinger et. al., "An Investigation of Conceptual Model of SMS Marketing", Proceedings of 37th Hawaii International Conference on System Sciences, Jan. 2004, pp. 1-10 (10 pages).
Estes, Adam Clark, "Amazon's Newest Gadget Is a Tablet That's Also an Echo", Gizmodo, Sep. 19, 2017 (3 pages).
Examination Report for AU Appln. Ser. No. 2017384996 dated Nov. 25, 2019 (2 pages).
Examination Report for EP Appln. Ser. No. 05763971.8 dated Mar. 29, 2011 (4 pages).
Examination Report for EP Appln. Ser. No. 05763971.8-2221 dated Mar. 29, 2011 (4 pages).
Examination Report for EP Appln. Ser. No. 05768157.9 dated Aug. 21, 2014 (6 pages).
Examination Report for EP Appln. Ser. No. 05768157.9 dated Jan. 27, 2014 (5 pages).
Examination Report for EP Appln. Ser. No. 05768157.9 dated Jul. 23, 2015 (7 pages).
Examination Report for EP Appln. Ser. No. 05768157.9-1958 dated Feb. 15, 2013 (5 pages).
Examiner's Re-Examination Report for AU Appln. Ser. No. 2005259861 dated Dec. 1, 2011 (2 pages).
Feng et al., "Active Profiling of Physical Devices at Internet Scale", IEEE, 2016 (9 pages).
Final Office Action for U.S. Appl. No. 10/880,868 dated Apr. 13, 2010 (8 pages).
Final Office Action for U.S. Appl. No. 10/880,868 dated Jul. 17, 2009 (7 pages).
Final Office Action for U.S. Appl. No. 10/880,868 dated Mar. 24, 2015 (16 pages).
Final Office Action for U.S. Appl. No. 11/026,507 dated Apr. 6, 2015 (9 pages).
Final Office Action for U.S. Appl. No. 11/026,507 dated Jan. 12, 2010 (19 pages).
Final Office Action for U.S. Appl. No. 11/026,507 dated Mar. 24, 2011 (19 pages).
Final Office Action for U.S. Appl. No. 13/441,298 dated Dec. 30, 2013 (12 pages).
Final Office Action for U.S. Appl. No. 13/441,298 dated Nov. 20, 2015 (16 pages).
Final Office Action for U.S. Appl. No. 13/478,998 dated Feb. 27, 2017 (21 pages).
Final Office Action for U.S. Appl. No. 13/478,998 dated Jan. 20, 2016 (22 pages).
Final Office Action for U.S. Appl. No. 13/840,380 dated Aug. 3, 2018 (12 pages).
Final Office Action for U.S. Appl. No. 13/840,380 dated Feb. 27, 2017 (7 pages).
Final Office Action for U.S. Appl. No. 13/840,380 dated Oct. 22, 2015 (32 pages).
Final Office Action for U.S. Appl. No. 14/172,353 dated Apr. 4, 2018 (22 pages).
Final Office Action for U.S. Appl. No. 14/172,353 dated Aug. 10, 2017 (15 pages).
Final Office Action for U.S. Appl. No. 14/172,353 dated Dec. 14, 2018 (21 pages).
Final Office Action for U.S. Appl. No. 14/172,353 dated Jan. 21, 2016 (28 pages).
Final Office Action for U.S. Appl. No. 14/230,508 dated Jun. 3, 2015 (20 pages).
Final Office Action for U.S. Appl. No. 15/189,826 dated Jun. 3, 2019 (31 pages).
Final Office Action for U.S. Appl. No. 15/491,734 dated May 28, 2019 (24 pages).
Final Office Action for U.S. Appl. No. 15/584,970 dated May 31, 2019 (23 pages).
Final Office Action for U.S. Appl. No. 15/587,132 dated Jul. 9, 2020 (27 pages).
Final Office Action for U.S. Appl. No. 15/603,701 dated Apr. 2, 2019 (14 pages).
Final Office Action for U.S. Appl. No. 15/638,291 dated Jan. 30, 2020 (24 pages).
Final Office Action for U.S. Appl. No. 15/638,295 dated Jan. 30, 2020 (25 pages).
First Office Action for JP Appln. Ser. No. 2007-519374 dated May 29, 2012 (47 pages).
First Office Action for JP Appln. Ser. No. 2010-142707 dated Jul. 23, 2013 (4 pages).
First Office Action for JP Appln. Ser. No. 2010-142707 dated Nov. 13, 2012 (4 pages).
First Office Action for JP Appln. Ser. No. 2010-232591 dated Feb. 19, 2013 (7 pages).
First Office Action for JP Appln. Ser. No. 2010-232591 dated Jun. 9, 2015 (7 pages).
First Office Action for JP Appln. Ser. No. 2014-010608 dated Nov. 18, 2014 (4 pages).
Fisher et al., "The Role of Text Analytics and Information Retrieval in the Accounting Domain," Journal of Emerging Technologies in Accounting, vol. 7, Dec. 2010 (25 pages).
Forrest, Conner, "Essential Home wants to be 'bridge' between Amazon Alexa, Apple's Siri, and Google Assistant," TechRepublic, May 31, 2017 (9 pages).
Foxx, Chris, "Apple reveals HomePod smart speaker", BBC, Jun. 5, 2017 (9 pages).

(56) References Cited

OTHER PUBLICATIONS

Gebhart, Andrew, "Google Assistant is spreading, but it needs its own 'Echo Dot'", CNET, May 20, 2017 (6 pages).
Gebhart, Andrew, "Google Home to the Amazon Echo: 'Anything you can do . . . '", CNET, May 18, 2017 (7 pages).
Gibbs, Samuel, "Your Facebook Messenger app is about to be filled with ads", The Guardian, Jul. 12, 2017, retrieved Aug. 22, 2017 from URL: https://www.theguardian.com/technology/2017/jul/12/facebook-messenger-app-adverts (3 pages).
Golgowski, Nina, "This Burger King Ad Is Trying to Control Your Google Home Device", HuffPost, Apr. 12, 2017 (7 pages).
Gotoh, Shintaro et al., "Citizens Lectures on GIS using MANDARA and EXCEL, Make a Map by PC," Kokin Shoin, 1st Edition, Apr. 5, 2004, ISBN 4-7722-4051-9, Kokon, Japan (4 pages).
Gurman et al., "Apple Is Manufacturing a Siri Speaker to Outdo Google and Amazon", Bloomberg, May 31, 2017 (3 pages).
Hardwick, Tim, "Facebook Smart Speaker Coming Next Year With 15-inch Touch Panel", MacRumors, Jul. 25, 2017 (5 pages).
Heater, Brian, "Amazon Alexa devices can finally tell voices apart", TechCrunch, Oct. 11, 2017 (6 pages).
Information Access Technologies, Inc., Aaddzz.com website archive from www.Archive.org, dated Jan. 30, 1998 (42 pages).
Information Access Technologies, Inc., "The Best Way To Buy And Sell Web Advertising Space", Aaddzz Brochure, dated 1997 (6 pages).
Ingenio, Inc., "Ingenio: Click To Call Solutions," reprinted from: http://www.in2enio.com/documents/cominfo/clicktocall.aso?TF=1 on Jun. 29, 2004 (3 pages).
International Preliminary Report on Patentability, Ch. I, for PCT Appln. Ser. No. PCT/US2013/042376 dated Dec. 4, 2014 (10 pages).
International Preliminary Report on Patentability, Ch. I, for PCT Appln. Ser. No. PCT/US2013/077834 dated Aug. 13, 2015 (7 pages).
International Preliminary Report on Patentability, Ch. I, for PCT Appln. Ser. No. PCT/US2017/049782 dated Jul. 11, 2019 (12 pages).
International Search Report and Written Opinion for PCT Appln. Ser. No. PCT/US2005/023023 dated Oct. 23, 2006 (5 pages).
International Search Report and Written Opinion for PCT Appln. Ser. No. PCT/US2013/042376 dated Feb. 28, 2014 (13 pages).
International Search Report and Written Opinion for PCT Appln. Ser. No. PCT/US2017/049782 dated Oct. 25, 2017 (17 pages).
International Search Report for PCT Appln. Ser. No. PCT/US05/23023 dated Oct. 23, 2006 (2 pages).
International Search Report for PCT Appln. Ser. No. PCT/US05/23162 dated Dec. 22, 2006 (2 pages).
International Search Report for PCT Appln. Ser. No. PCT/US2013/077834 dated Apr. 24, 2014 (5 pages).
Johnston, Lisa, "Amazon Whirlwind: New Echo, Plus, Spot, Connect, Fire TV Take The Stage", Twice, Sep. 27, 2017 (10 pages).
Jones et al., "Improving Web Interaction in small displays", Computer Networks, vol. 31, May 17, 1999 (9 pages).
Kato, Sako, "Keyword Advertisement", Internet Magazine, 2nd Stage, No. 2, May 1, 2004, Japan, Impress Holdings, Inc. (14 pages).
Kelion, Leo, "Amazon revamps Echo smart speaker family", BBC News, Sep. 27, 2017 (11 pages).
Kelion, Leo, "Amazon's race to make Alexa smarter", BBC News, Jul. 28, 2017 (8 pages).
Koetsier, John, "Ads On Amazon Echo: Wendy's, ESPN, And Progressive Among Brands Testing", Forbes, May 11, 2017 (3 pages).
Krishna, Swapna, "Jim Beam's smart decanter will pour you a shot when you ask", engadget, Nov. 29, 2017 (3 pages).
Lacy, Lisa, "Improving search and advertising are the next frontiers for voice-activated devices", TechCrunch, Dec. 20, 2017 (13 pages).
Larson, Selena, "Google Home now recognizes your individual voice", CNN Money, San Francisco, California, Apr. 20, 2017 (3 pages).

Lee, Dave, Take Two for Samsung's troubled Bixby assistant, BBC News, Oct. 19, 2017 (6 pages).
Lee, Dave, "The five big announcements from Google I/O", BBC, May 18, 2017 (11 pages).
Lund, Pamela, "Mastering Google Product Feeds and Product Listing Ads—Part 1", retrieved Dec. 28, 2013 from URL: http://www.blueglass.com/blog/mastering-google-product-feeds-and-product-listing-ads-part-1/#comments (17 pages).
Morton, Kyle, "Read about your Mobile Click-to-call patent application", email to Shumeet Baluja dated Jan. 12, 2006 (1 page).
Nieva, Richard, "Google Home and eBay can tell you how much that's worth", CNET, Mar. 8, 2017 (3 pages).
Non-Final Office Action for U.S. Appl. No. 10/880,686 dated May 7, 2008 (8 pages).
Non-Final Office Action for U.S. Appl. No. 10/880,868 dated Apr. 1, 2016 (20 pages).
Non-Final Office Action for U.S. Appl. No. 10/880,868 dated Dec. 4, 2008 (8 pages).
Non-Final Office Action for U.S. Appl. No. 10/880,868 dated Nov. 28, 2014 (7 pages).
Non-Final Office Action for U.S. Appl. No. 10/880,868 dated Sep. 23, 2009 (7 pages).
Non-Final Office Action for U.S. Appl. No. 11/026,507 dated Aug. 14, 2014 (9 pages).
Non-Final Office Action for U.S. Appl. No. 11/026,507 dated Jul. 21, 2010 (19 pages).
Non-Final Office Action for U.S. Appl. No. 11/026,507 dated Mar. 30, 2009 (20 pages).
Non-Final Office Action for U.S. Appl. No. 11/026,507 dated Oct. 29, 2015 (31 pages).
Non-Final Office Action for U.S. Appl. No. 13/441,298 dated Jan. 13, 2017 (10 pages).
Non-Final Office Action for U.S. Appl. No. 13/441,298 dated Jul. 17, 2013 (8 pages).
Non-Final Office Action for U.S. Appl. No. 13/441,298 dated Jul. 6, 2015 (14 pages).
Non-Final Office Action for U.S. Appl. No. 13/478,998 dated Jul. 31, 2015 (26 pages).
Non-Final Office Action for U.S. Appl. No. 13/478,998 dated Oct. 5, 2016 (21 pages).
Non-Final Office Action for U.S. Appl. No. 13/840,380 dated Aug. 12, 2016 (28 pages).
Non-Final Office Action for U.S. Appl. No. 13/840,380 dated Dec. 6, 2017 (13 pages).
Non-Final Office Action for U.S. Appl. No. 13/840,380 dated Mar. 26, 2015 (26 pages).
Non-Final Office Action for U.S. Appl. No. 14/155,323 dated May 7, 2015 (25 pages).
Non-Final Office Action for U.S. Appl. No. 14/172,353 dated Feb. 9, 2017 (28 pages).
Non-Final Office Action for U.S. Appl. No. 14/172,353 dated Jul. 6, 2015 (35 pages).
Non-Final Office Action for U.S. Appl. No. 14/172,353 dated May 17, 2018 (20 pages).
Non-Final Office Action for U.S. Appl. No. 14/230,508 dated Feb. 1, 2016 (18 pages).
Non-Final Office Action for U.S. Appl. No. 14/230,508 dated Nov. 28, 2014 (24 pages).
Non-Final Office Action for U.S. Appl. No. 15/084,223 dated Sep. 4, 2018 (13 pages).
Non-Final Office Action for U.S. Appl. No. 15/189,826 dated Nov. 9, 2018 (30 pages).
Non-Final Office Action for U.S. Appl. No. 15/395,703 dated Oct. 19, 2017 (11 pages).
Non-Final Office Action for U.S. Appl. No. 15/491,734 dated Jan. 30, 2019 (26 pages).
Non-Final Office Action for U.S. Appl. No. 15/584,970 dated Nov. 16, 2018 (21 pages).
Non-Final Office Action for U.S. Appl. No. 15/587,132 dated Mar. 5, 2020 (24 pages).
Non-Final Office Action for U.S. Appl. No. 15/603,701 dated Nov. 2, 2018 (13 pages).

(56) References Cited

OTHER PUBLICATIONS

Non-Final Office Action for U.S. Appl. No. 15/603,701 dated Sep. 12, 2019 (15 pages).
Non-Final Office Action for U.S. Appl. No. 15/638,291 dated Sep. 6, 2019 (22 pages).
Non-Final Office Action for U.S. Appl. No. 15/638,295 dated Sep. 6, 2019 (26 pages).
Non-Final Office Action for U.S. Appl. No. 15/674,838 dated Jun. 10, 2019 (6 pages).
Non-Final Office Action for U.S. Appl. No. 15/674,838 dated Nov. 30, 2018 (11 pages).
Non-Final Office Action for U.S. Appl. No. 16/039,202 dated Aug. 14, 2018 (19 pages).
Non-Final Office Action for U.S. Appl. No. 16/039,204 dated Aug. 15, 2018 (21 pages).
Non-Final Office Action for U.S. Appl. No. 16/266,927 dated Jun. 25, 2020 (7 pages).
Non-Final Office Action for U.S. Appl. No. 16/666,780 dated Jan. 27, 2020 (10 pages).
Notice of Allowance for JP Appln. Ser. No. 2017-556912 dated Aug. 9, 2019 (8 pages).
Notice of Allowance for KR Appln. Ser. No. 10-2017-7031603 dated Mar. 28, 2019 (3 pages).
Notice of Allowance for KR Appln. Ser. No. 10-2019-7018803 dated Oct. 11, 2019 (3 pages).
Notice of Allowance for U.S. Appl. No. 13/441,298 dated Nov. 2, 2017 (11 pages).
Notice of Allowance for U.S. Appl. No. 13/478,998 dated Apr. 23, 2018 (8 pages).
Notice of Allowance for U.S. Appl. No. 13/478,998 dated Jan. 26, 2018 (8 pages).
Notice of Allowance for U.S. Appl. No. 13/478,998 dated Sep. 12, 2017 (9 pages).
Notice of Allowance for U.S. Appl. No. 13/478,998 dated Sep. 21, 2018 (8 pages).
Notice of Allowance for U.S. Appl. No. 13/840,380 dated Dec. 11, 2019 (12 pages).
Notice of Allowance for U.S. Appl. No. 13/840,380 dated May 14, 2019 (8 pages).
Notice of Allowance for U.S. Appl. No. 13/840,380 dated Sep. 20, 2019 (11 pages).
Notice of Allowance for U.S. Appl. No. 15/395,703 dated Apr. 4, 2018 (2 pages).
Notice of Allowance for U.S. Appl. No. 15/395,703 dated Feb. 14, 2018 (9 pages).
Notice of Allowance for U.S. Appl. No. 15/491,734 dated Jan. 31, 2020 (18 pages).
Notice of Allowance for U.S. Appl. No. 15/491,734 dated Jul. 23, 2020 (4 pages).
Notice of Allowance for U.S. Appl. No. 15/491,734 dated May 29, 2020 (12 pages).
Notice of Allowance for U.S. Appl. No. 15/603,701 dated Apr. 22, 2020 (8 pages).
Notice of Allowance for U.S. Appl. No. 15/603,701 dated Jan. 10, 2020 (8 pages).
Notice of Allowance for U.S. Appl. No. 15/603,701 dated Jun. 30, 2020 (2 pages).
Notice of Allowance for U.S. Appl. No. 15/638,298 dated Feb. 21, 2020 (15 pages).
Notice of Allowance for U.S. Appl. No. 15/638,298 dated May 12, 2020 (13 pages).
Notice of Allowance for U.S. Appl. No. 15/674,838 dated Dec. 3, 2019 (2 pages).
Notice of Allowance for U.S. Appl. No. 15/674,838 dated Mar. 11, 2020 (8 pages).
Notice of Allowance for U.S. Appl. No. 15/674,838 dated Sep. 20, 2019 (8 pages).
Notice of Allowance for U.S. Appl. No. 16/039,202 dated Apr. 4, 2019 (8 pages).
Notice of Allowance for U.S. Appl. No. 16/039,202 dated Dec. 10, 2018 (8 pages).
Notice of Allowance for U.S. Appl. No. 16/039,202 dated Jul. 17, 2019 (8 pages).
Notice of Allowance for U.S. Appl. No. 16/039,202 dated Oct. 9, 2019 (8 pages).
Notice of Allowance for U.S. Appl. No. 16/039,204 dated Dec. 10, 2018 (8 pages).
Notice of Allowance for U.S. Appl. No. 16/039,204 dated Jan. 17, 2019 (3 pages).
Notice of Allowance for U.S. Appl. No. 16/039,204 dated Jul. 15, 2019 (8 pages).
Notice of Allowance for U.S. Appl. No. 16/039,204 dated Mar. 20, 2019 (8 pages).
Notice of Allowance for U.S. Appl. No. 16/039,204 dated Oct. 30, 2019 (8 pages).
Notice of Allowance for U.S. Appl. No. 16/666,780 dated Apr. 14, 2020 (6 pages).
Notice of Final Rejection for KR Appln. Ser. No. 10-2007-7002383 dated Apr. 22, 2010 (10 pages).
Notice of Final Rejection for KR Appln. Ser. No. 10-2007-7002385 dated Jul. 30, 2009 (7 pages).
Notice of Final Rejection for KR Appln. Ser. No. 10-2010-7013914 dated Sep. 14, 2011 (5 pages).
Notice of Preliminary Rejection for KR Appln. Ser. No. 10-2007-7002383 dated Jun. 10, 2009 (11 pages).
Notice of Preliminary Rejection for KR Appln. Ser. No. 10-2007-7002385 dated Jun. 10, 2008 (11 pages).
Notice of Preliminary Rejection for KR Appln. Ser. No. 10-2010-7013914 dated Sep. 17, 2010 (9 pages).
Notice of Reasons for Rejection for JP Appln. Ser. No. 2007-519374 dated Aug. 25, 2009 (7 pages).
Notice of Reasons for Rejection for JP Appln. Ser. No. 2007-519407 dated Jul. 7, 2009 (7 pages).
Novet, et al., "Amazon is getting ready to bring Alexa to work", CNBC, Nov. 29, 2017 (4 pages).
Office Action for AU Appln. Ser. No. 2005259861 dated Mar. 6, 2008 (2 pages).
Office Action for AU Appln. Ser. No. 2005260566 dated Mar. 4, 2008 (2 pages).
Office Action for CA Appln. Ser. No. 2572468 dated Dec. 29, 2011 (4 pages).
Office Action for CA Appln. Ser. No. 2572468 dated Dec. 4, 2014 (3 pages).
Office Action for CA Appln. Ser. No. 2572468 dated Sep. 17, 2013 (4 pages).
Office Action for CA Appln. Ser. No. 2572471 dated Jan. 9, 2014 (3 pages).
Office Action for CA Appln. Ser. No. 2572471 dated Mar. 16, 2009 (4 pages).
Office Action for CA Appln. Ser. No. 2572471 dated Mar. 3, 2015 (3 pages).
Office Action for CA Appln. Ser. No. 2572471 dated May 21, 2010 (2 pages).
Office Action for CN Appln. Ser. No. 200580025826.2 dated Dec. 18, 2009 (12 pages).
Office Action for CN Appln. Ser. No. 200580025878.X dated May 7, 2010 (10 pages).
Office Action for IN Appln. Ser. No. 144/MUMNP/2007 dated Jun. 19, 2008 (2 pages).
Office Action for KR Appln. Ser. No. 10-2017-7031603 dated Jan. 22, 2019 (8 pages).
Office Action for KR Appln. Ser. No. 10-2019-7018803 dated Jul. 16, 2019 (7 pages).
Official Letter of Inquiry for JP Appln. Ser. No. 2007-519374 dated Oct. 4, 2011 (6 pages).
Page, James: "On2go Without Prejudice," email to karima@google.com, dated Jan. 12, 2006 (1 page).
Palladino, Valentina, "Garmin teamed up with Amazon to make a tiny Echo Dot for your car", ars TECHNICA, Oct. 17, 2017 (2 pages).

(56) References Cited

OTHER PUBLICATIONS

Perez, Sarah, "Alexa's 'Routines' will combine smart home control with other actions, like delivering your news and weather", TechCrunch, Sep. 28, 2017 (10 pages).
Perez, Sarah, "The first ad network for Alexa Skills shuts down following Amazon's policy changes", TechCrunch, Jun. 15, 2017 (8 pages).
Porter, Jon, "Amazon Echo Show release date, price, news and features", TechRadar, Jun. 26, 2017 (11 pages).
Pringle, Ramona, "'I'm sorry to hear that': Why training Siri to be a therapist won't be easy", CBC News, Sep. 24, 2017 (3 pages).
Purcher, Jack, "Apple Patent Reveals a New Security Feature Coming to Siri", Patently Apple, Apr. 4, 2017, reprinted from http://www.patentlyapple.com/patently-apple/2017/04/apple-patent-reveals-a-new-security-feature-coming-to-siri.html (6 pages).
Purcher, Jack, "The Patent behind Google Home's new Feature of Understanding Different Voices in the Home Surfaced Today", Patently Mobile, Apr. 20, 2017, reprinted from http://www.patentlymobile.com/2017/04/the-patent-behind-google-homes-new-feature-of-understanding-different-voices-in-the-home-surfaced-today.html (3 pages).
Purcher, Jack, "Today Google Home's Virtual Assistant can learn its Owner's voice for Security Reasons like Apple's Patent Pending Idea", Patently Apple, Apr. 20, 2017 (4 pages).
Pure Oxygen Labs, "How to Deep Link to Alexa Skills," Oct. 11, 2017 (16 pages).
Reasons for Rejection for JP Appln. Ser. No. 2017-556912 dated Mar. 4, 2019 (8 pages).
Sablich, Justin, "Planning a Trip With the Help of Google Home", New York Times, dated May 31, 2017 (6 pages).
Second Office Action for CN Appln. Ser. No. 200580025826.2 dated Jul. 22, 2011 (7 pages).
Second Office Action for CN Appln. Ser. No. 200580025878.X dated Oct. 26, 2011 (8 pages).
Seifert, Dan, "Samsung's new virtual assistant will make using your phone easier", The Verge, Mar. 20, 2017 (6 pages).
Sherr, Ian, "IBM built a voice assistant for cybersecurity", CNET, Feb. 13, 2017 (9 pages).
Siegal, Daniel, "IP Attys Load Up Apps' Legal Challenges At 'Silicon Beach'", Law360, Los Angeles, California, Feb. 2, 2017 (4 pages).
Simonite, Tom, "How Alexa, Siri, and Google Assistant Will Make Money Off You," Technology Review, May 31, 2016, technologyreview.com (9 pages).
Simonite, Tom, "How Assistant Could End Up Eating Google's Lunch," Technology Review, Sep. 23, 2016, technologyreview.com (8 pages).
Smith, Dave, "The Amazon Echo got 2 incredibly useful features thanks to a new update", Business Insider, Jun. 1, 2017 (2 pages).
Statement Regarding References in 1449 Form (2 pages).
Supplementary European Search Report for EP Appln. Ser. No. 05768157.9 dated Oct. 31, 2012 (3 pages).
Tedeschi, Bob, "Transforming Clicks Into Rings", New York Times, Jun. 7, 2004, downloaded from www.nytimes.com on Jun. 6, 2004 (3 pages).
Third Office Action for CN Appln. Ser. No. 200580025826.2 dated Apr. 11, 2012 (13 pages).
Third Office Action for CN Appln. Ser. No. 200580025878.X dated Feb. 21, 2012 (10 pages).
U.S. Pat. No. 6,446,045-B1, "Request for Inter Partes Reexamination Under 35 U.S.C. 311 and 37 C.F.R. 1.913" dated Jul. 7, 2008 (54 pages).
U.S. Pat. No. 6,829,587-B2, "Request for Inter Partes Reexamination Under 35 U.S.C. 311 and 37 C.F.R. 1.913" dated Jul. 14, 2008 (85 pages).
U.S. Pat. No. 7,240,025-B2, "Request for Inter Partes Reexamination Under 35 U.S.C. 311 and 37 C.F.R. 1.913" dated Jul. 30, 2008 (85 pages).
U.S. Pat. No. 7,249,059, "Request for Inter Partes Reexamination Under 35 U.S.C. 311 and 37 C.F.R. 1.913" dated Jul. 21, 2008 (81 pages).
Willens, Max, "For publishers, Amazon Alexa holds promise but not much money (yet)", DIGIDAY, Jul. 6, 2017 (5 pages).
Written Opinion for PCT Appln. Ser. No. PCT/US05/23023 dated Oct. 23, 2006 (3 pages).
Written Opinion for PCT Appln. Ser. No. PCT/US05/23162 dated Dec. 22, 2006 (4 pages).
Xue et al., "Unstructured Queries Based On Mobile User Context," International Journal of Pervasive Computing and Communications, vol. 8, No. 4, dated Aug. 27, 2012 (28 pages).
Zeff, et al., "Advertising on the Internet, 2nd Edition", Chapter 1-4, Wiley Computer Publishing, John Wiley & Sons, 1999 (130 pages).
Examination Report for GB Appln. Ser. No. 1804023.8 dated Jun. 9, 2021 (4 pages).
Notice of Allowance for U.S. Appl. No. 16/696,622 dated May 26, 2021 (6 pages).
Machine Translated Chinese Search Report Corresponding to Application No. 202210606342.2 dated Dec. 26, 2922.

\* cited by examiner

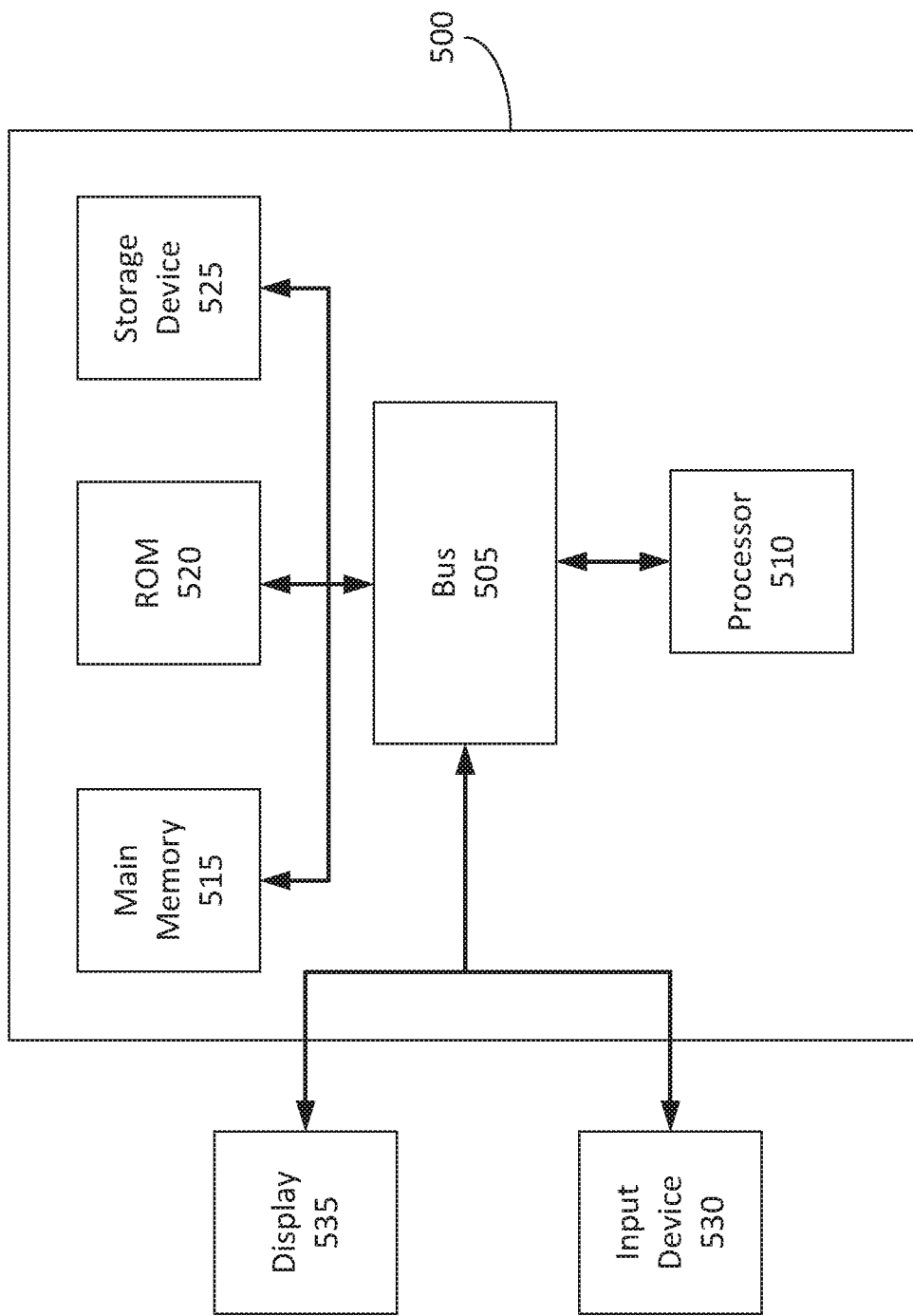

MULTIMODAL TRANSMISSION OF PACKETIZED DATA

CROSS-REFERENCE TO RELATED APPLICATIONS

This application claims the benefit of priority under 35 U.S.C. § 120 as a continuation of U.S. patent application Ser. No. 16/666,780, filed Oct. 29, 2019, which claims the benefit of priority under 35 U.S.C. § 120 as a continuation of U.S. patent application Ser. No. 16/039,204, filed Jul. 18, 2018, which claims the benefit of priority under 35 U.S.C. § 120 as a continuation-in-part of U.S. patent application Ser. No. 15/395,703, filed Dec. 30, 2016, each of which is hereby incorporated by reference herein in its entirety.

BACKGROUND

Transmitting data to a computing devices that is utilizing computing resources can result in excessive network transmissions, packet-based or otherwise, of network traffic data and prevent a computing device from properly processing the network traffic data, completing an operation related to the network traffic data, or timely responding to the network traffic data. The control of network transmissions corresponding to content item objects can be complicated by the large number of content item objects that can initiate network transmissions of network traffic data between computing devices.

SUMMARY

At least one aspect is directed to a system of multi-modal transmission of packetized data in a voice activated data packet based computer network environment. A natural language processor component executed by a data processing system can receive, via an interface of the data processing system, data packets comprising an input audio signal detected by a sensor of a client computing device. The natural language processor component can parse the input audio signal to identify a request and a trigger keyword corresponding to the request. A direct action application programming interface of the data processing system can generate, based on at least one of the request and the trigger keyword, a first action data structure. A content selector component executed by the data processing system can receive at least one of the request and the trigger keyword identified by the natural language processor and can select, based on at least one of the request and the trigger keyword, a content item via a real-time content selection process. An interface management component of the data processing system can poll a plurality of interfaces to identify a first candidate interface and a second candidate interface, and can determine a first resource utilization value for the first candidate interface and a second resource utilization value for the second candidate interface. The first resource utilization value and the second resource utilization value can be based on at least one of a battery status, processor utilization, memory utilization, an interface parameter, and network bandwidth utilization. The interface management component can select, based on a comparison of the first resource utilization value and the second resource utilization value, the first candidate interface as a selected interface to present the content item, and can convert the content item for delivery in a modality compatible with the selected interface selected based on the comparison of the first resource utilization value and the second resource utilization value. The interface management component can provide the first action data structure to the client computing device for rendering as audio output from the client computing device, and can transmit the content item converted for the first modality to deliver the content item for rendering from the selected interface.

At least one aspect is directed to a method of multi-modal transmission of packetized data in a voice activated data packet based computer network environment. The method can receive, by a natural language processor component executed by a data processing system, via an interface of the data processing system, data packets comprising an input audio signal detected by a sensor of a client computing device. The method can identify, by the natural language processor component, from the input audio signal, a request and a trigger keyword corresponding to the request. The method can generate, by a direct action application programming interface of the data processing system, based on at least one of and the trigger keyword, a first action data structure. The method can receive, by a content selector component executed by the data processing system, at least one of the request and the trigger keyword identified by the natural language processor and can select, based on at least one of the request and the trigger keyword, a content item via a real-time content selection process. The method can poll, by an interface management component of the data processing system, a plurality of interfaces to identify a first candidate interface and a second candidate interface. The method can determine, by the interface management component, a first resource utilization value for the first candidate interface and a second resource utilization value for the second candidate interface. The first resource utilization value and the second resource utilization value can be based on at least one of a battery status, processor utilization, memory utilization, an interface parameter, and network bandwidth utilization. The method can select, based on a comparison of the first resource utilization value and the second resource utilization value, the first candidate interface as a selected interface to present the content item. The method can convert the content item for delivery in a modality compatible with the selected interface selected based on the comparison of the first resource utilization value and the second resource utilization value. The method can provide the first action data structure to the client computing device for rendering as audio output from the client computing device. The method can transmit the content item converted for the first modality to deliver the content item for rendering from the selected interface.

At least one aspect is directed to a computer readable storage medium storing instructions that when executed by one or more data processors, cause the one or more data processors to perform operations for multi-modal transmission of packetized data in a voice activated data packet based computer network environment. The operations can receive, by a natural language processor component executed by a data processing system, via an interface of the data processing system, data packets comprising an input audio signal detected by a sensor of a client computing device. The operations can identify, by the natural language processor component, from the input audio signal, a request and a trigger keyword corresponding to the request. The operations can generate, by a direct action application programming interface of the data processing system, based on at least one of and the trigger keyword, a first action data structure. The operations can receive, by a content selector component executed by the data processing system, at least one of the request and the trigger keyword identified by the natural language processor and can select, based on at least one of the request and the trigger keyword, a content item via a real-time content selection process. The operations can poll, by an interface management component of the data processing system, a plurality of interfaces to identify a first candidate interface and a second candidate interface. The operations can determine, by the interface management component, a first resource utilization value for the first candidate interface and a second resource utilization value for the second candidate interface. The first resource utilization value and the second resource utilization value can be based on at least one of a battery status, processor utilization, memory utilization, an interface parameter, and network bandwidth utilization. The operations can select, based on a comparison of the first resource utilization value and the second resource utilization value, the first candidate interface as a selected interface to present the content item. The operations can convert the content item for delivery in a modality compatible with the selected interface selected based on the comparison of the first resource utilization value and the second resource utilization value. The operations can provide the first action data structure to the client computing device for rendering as audio output from the client computing device. The operations can transmit the content item converted for the first modality to deliver the content item for rendering from the selected interface.

At least one aspect is directed to a system of multi-modal transmission of packetized data in a voice activated data packet based computer network environment. The system can include a data processing system comprising one or more processors and memory. The data processing system can execute a natural language processor, a direct action application programming interface, a content selector or an interface management component. The natural language processor component can receive, via an interface of the data processing system, data packets comprising an input audio signal detected by a sensor of a client computing device. The natural language processor component can parse the input audio signal to identify a request and a trigger keyword corresponding to the request. The direct action application programming interface can generate, based on at least one of the request and the trigger keyword, one or more action data structures. The content selector component can receive at least one of the request and the trigger keyword identified by the natural language processor. The content selector can select, based on at least one of the request and the trigger keyword, one or more content items via a real-time content selection process. The interface management component can poll a plurality of interfaces to identify a first candidate interface and a second candidate interface within a threshold distance of the computing device. The interface management component can determine a first resource utilization value for the first candidate interface and a second resource utilization value for the second candidate interface. The interface management component can select, based on a comparison of the first resource utilization value and the second resource utilization value, the first candidate interface as a selected interface to present a first action data structures of the one or more action data structures and a first content item of the one or more content items. The interface management component can provide the first action data structure and the first content item for delivery in a modality compatible with the selected interface selected based on the comparison of the first resource utilization value and the second resource utilization value. The interface management component can transmit the first action data structure and the first content item in the modality to deliver the content item for presentation via the selected interface.

At least one aspect is directed to a method of multi-modal transmission of packetized data in a voice activated data packet based computer network environment. The method can include the data processing system receiving data packets comprising an input audio signal detected by a sensor of a client computing device. The method can include the data processing system parsing the input audio signal to identify a request and a trigger keyword corresponding to the request. The method can include the data processing system generating, based on at least one of the request and the trigger keyword, one or more action data structures. The method can include the data processing system receiving at least one of the request and the trigger keyword identified by the natural language processor. The method can include the data processing system selecting, based on at least one of the request and the trigger keyword, one or more content items via a real-time content selection process. The method can include the data processing system polling a plurality of interfaces to identify a first candidate interface and a second candidate interface within a threshold distance of the computing device. The method can include the data processing system determining a first resource utilization value for the first candidate interface and a second resource utilization value for the second candidate interface. The method can include the data processing system selecting, based on a comparison of the first resource utilization value and the second resource utilization value, the first candidate interface as a selected interface to present a first action data structures of the one or more action data structures and a first content item of the one or more content items. The method can include the data processing system providing the first action data structure and the first content item for delivery in a modality compatible with the selected interface selected based on the comparison of the first resource utilization value and the second resource utilization value. The method can include the data processing system transmitting the first action data structure and the first content item in the modality to deliver the content item for presentation via the selected interface.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings:

FIG. 5 is a block diagram illustrating a general architecture for a computer system that may be employed to implement elements of the systems and methods described and illustrated herein.

DETAILED DESCRIPTION

Figure 1:
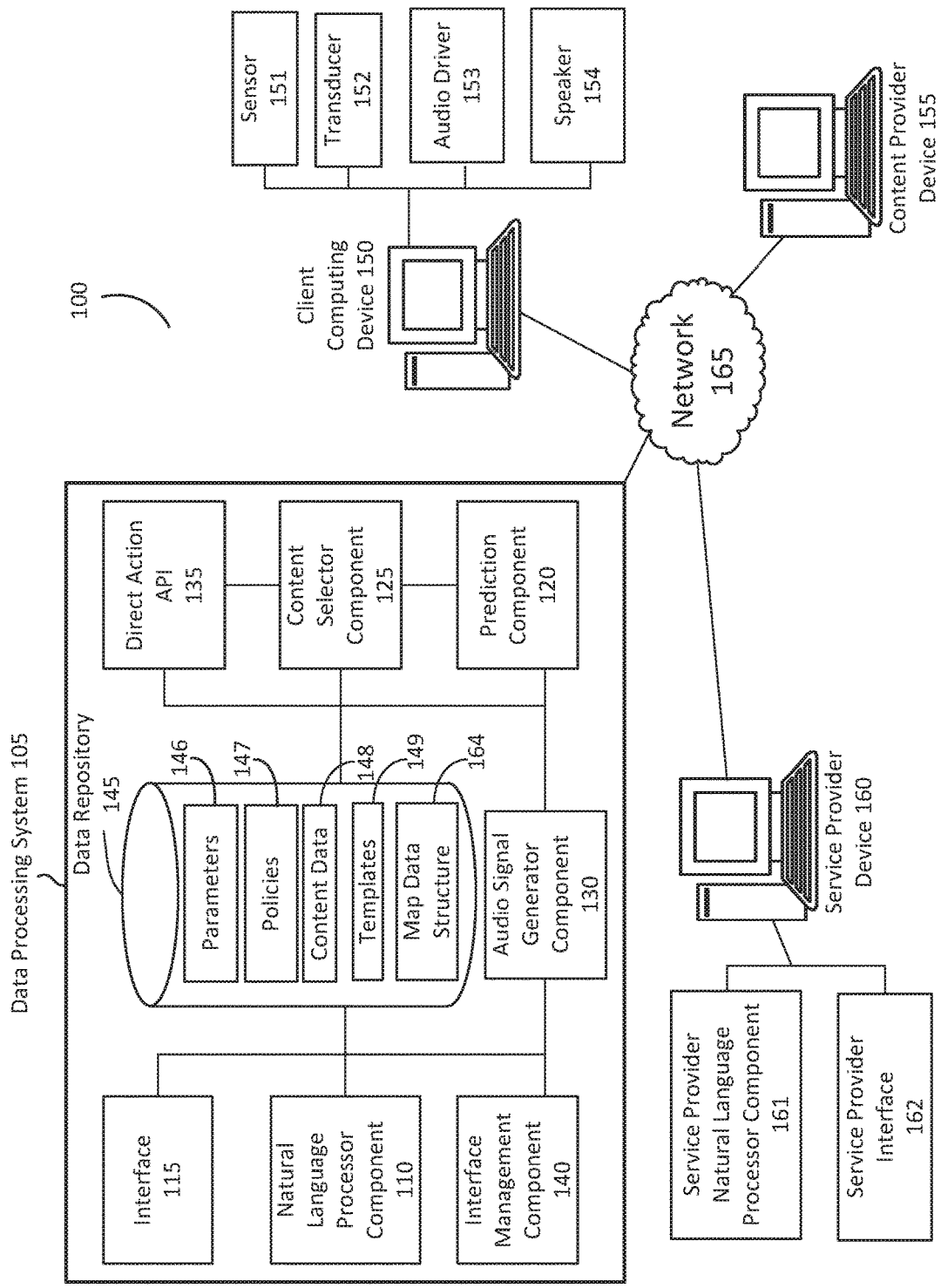
FIG. 1 depicts a system of multi-modal transmission of packetized data in a voice activated computer network environment.

Following below are more detailed descriptions of various concepts related to, and implementations of, methods, apparatuses, and systems for multi-modal transmission of packetized data in a voice activated data packet based computer network environment. The various concepts introduced above and discussed in greater detail below may be implemented in any of numerous ways.

Systems and methods of the present disclosure relate generally to a data processing system that identifies an optimal transmission modality for data packet (or other protocol based) transmission in a voice activated computer network environment. The data processing system can improve the efficiency and effectiveness of data packet transmission over one or more computer networks by, for example, selecting a transmission modality from a plurality of options for data packet routing through a computer network of content items to one or more client computing device, or to different interfaces (e.g., different apps or programs) of a single client computing device. Data packets or other protocol based signals corresponding to the selected operations can be routed through a computer network between multiple computing devices. For example the data processing system can route a content item to a different interface than an interface from which a request was received. The different interface can be on the same client computing device or a different client computing device from which a request was received. The data processing system can select at least one candidate interface from a plurality of candidate interfaces for content item transmission to a client computing device. The candidate interfaces can be determined based on technical or computing parameters such as processor capability or utilization rate, memory capability or availability, battery status, available power, network bandwidth utilization, interface parameters or other resource utilization values. By selecting an interface to receive and provide the content item for rendering from the client computing device based on candidate interfaces or utilization rates associated with the candidate interfaces, the data processing system can reduce network bandwidth usage, latency, or processing utilization or power consumption of the client computing device that renders the content item. This saves processing power and other computing resources such as memory, reduces electrical power consumption by the data processing system and the reduced data transmissions via the computer network reduces bandwidth requirements and usage of the data processing system.

The systems and methods described herein can include a data processing system that receives an input audio query, which can also be referred to as an input audio signal. From the input audio query the data processing system can identify a request and a trigger keyword corresponding to the request. Based on the trigger keyword or the request, the data processing system can generate a first action data structure. For example, the first action data structure can include an organic response to the input audio query received from a client computing device, and the data processing system can provide the first action data structure to the same client computing device for rendering as audio output via the same interface from which the request was received.

The data processing system can also select at least one content item based on the trigger keyword or the request. The data processing system can identify or determine a plurality of candidate interfaces for rendering of the content item(s). The interfaces can include one or more hardware or software interfaces, such as display screens, audio interfaces, speakers, applications or programs available on the client computing device that originated the input audio query, or on different client computing devices. The interfaces can include java script slots for online documents for the insertion of content items, as well as push notification interfaces. The data processing system can determine utilization values for the different candidate interfaces. The utilization values can indicate power, processing, memory, bandwidth, or interface parameter capabilities, for example. Based on the utilization values for the candidate interfaces the data processing system can select a candidate interface as a selected interface for presentation or rendering of the content item. For example, the data processing system can convert or provide the content item for delivery in a modality compatible with the selected interface. The selected interface can be an interface of the same client computing device that originated the input audio signal or a different client computing device. By routing data packets via a computing network based on utilization values associated with a candidate interface, the data processing system selects a destination for the content item in a manner that can use the least amount of processing power, memory, or bandwidth from available options, or that can conserve power of one or more client computing devices.

The data processing system can provide the content item or the first action data structure by packet or other protocol based data message transmission via a computer network to a client computing device. The output signal can cause an audio driver component of the client computing device to generate an acoustic wave, e.g., an audio output, which can be output from the client computing device. The audio (or other) output can correspond to the first action data structure or to the content item. For example the first action data structure can be routed as audio output, and the content item can be routed as a text based message. By routing the first action data structure and the content item to different interfaces, the data processing system can conserve resources utilized by each interface, relative to providing both the first action data structure and the content item to the same interface. This results in fewer data processing operations, less memory usage, or less network bandwidth utilization by the selected interfaces (or their corresponding devices) than would be the case without separation and independent routing of the first action data structure and the content item.

The data processing system of the present disclosure can use multiple display to display or present information responsive to a query received by a digital assistant. For example, the data processing system can include voice-based digital assistant multi-array display interface management component. A voice-based digital assistant can receive a query and responsive to the query identify a data set for display. The data set (e.g., one or more action data structures or one or more content items) for display or other presentation can be generated by the voice-based digital assistant in response to a voice query from a user having a first account. The data processing system can split the data set into multiple data components that might be in different formats, different protocols, or use different technologies.

The data processing system can identify one or more displays linked to the account. The data processing system can further determine characteristics of the identified displays, such as availability (e.g., if they are currently in-use or available to be used by the Assistant), screen size, location (e.g., same room as user), speaker available, etc. The data processing system can then match a data component of the data set to a display device. The data processing system can match the data component of the data set to the display device based on the environment of the display device, classification of the data component, or optimal surface for the data component, for example. The data processing system can then provide the matched data component to the corresponding display device for display.

For example, a query may be "My Day". The digital assistant can receive the "my day" query to generate four responses: 1) Calendar; 2) Weather; 3) Traffic; and 4) News. The digital assistant can display this information as four different cards on a mobile phone. Each card can have a different data source format; e.g., the news card can be an RSS feed that is periodically being updated; the calendar data source can be receive push notification as new calendar events are added; the traffic may be real-time information. The data processing system can match each card with a corresponding available display, and then provide the card information to the matched display in the appropriate data format using the appropriate protocols. Thus, the response to the single query can be split or divided into multiple components for presentation on multiple interfaces, devices, surfaces or displays. If one of the devices is busy, the data component can be re-directed to another interface or other device.

For example, the data processing system can determine to play audio only via one screen, and display only on another screen. The data processing system can determine to provide third-party content on one or more of the screens. The data processing system can suggest different display devices to use; for example, a user may want to view pictures from a vacation. The user may request to view the pictures from their phone, but the data processing system can detect that a display device with a large screen is available, and prompt the user to determine whether the user would like to display these pictures on the large screen instead.

FIG. 1 depicts an example system 100 to for multi-modal transmission of packetized data in a voice activated data packet (or other protocol) based computer network environment. The system 100 can include at least one data processing system 105. The data processing system 105 can include at least one server having at least one processor. For example, the data processing system 105 can include a plurality of servers located in at least one data center or server farm. The data processing system 105 can determine, from an audio input signal a request and a trigger keyword associated with the request. Based on the request and trigger keyword the data processing system 105 can determine or select at least one action data structure, and can select at least one content item (and initiate other actions as described herein). The data processing system 105 can identify candidate interfaces for rendering of the action data structures or the content items, and can provide the action data structures or the content items for rendering by one or more candidate interfaces on one or more client computing devices based on resource utilization values for or of the candidate interfaces, for example as part of a voice activated communication or planning system. The action data structures (or the content items) can include one or more audio files that when rendered provide an audio output or acoustic wave. The action data structures or the content items can include other content (e.g., text, video, or image content) in addition to audio content.

The data processing system 105 can include multiple, logically-grouped servers and facilitate distributed computing techniques. The logical group of servers may be referred to as a data center, server farm or a machine farm. The servers can be geographically dispersed. A data center or machine farm may be administered as a single entity, or the machine farm can include a plurality of machine farms. The servers within each machine farm can be heterogeneous—one or more of the servers or machines can operate according to one or more type of operating system platform. The data processing system 105 can include servers in a data center that are stored in one or more high-density rack systems, along with associated storage systems, located for example in an enterprise data center. The data processing system 105 with consolidated servers in this way can improve system manageability, data security, the physical security of the system, and system performance by locating servers and high performance storage systems on localized high performance networks. Centralization of all or some of the data processing system 105 components, including servers and storage systems, and coupling them with advanced system management tools allows more efficient use of server resources, which saves power and processing requirements and reduces bandwidth usage.

The data processing system 105 can include at least one natural language processor (NLP) component 110, at least one interface 115, at least one prediction component 120, at least one content selector component 125, at least one audio signal generator component 130, at least one direct action application programming interface (API) 135, at least one interface management component 140, and at least one data repository 145. The NLP component 110, interface 115, prediction component 120, content selector component 125, audio signal generator component 130, direct action API 135, and interface management component 140 can each include at least one processing unit, server, virtual server, circuit, engine, agent, appliance, or other logic device such as programmable logic arrays configured to communicate with the data repository 145 and with other computing devices (e.g., at least one client computing device 150, at least one content provider computing device 155, or at least one service provider computing device 160) via the at least one computer network 165. The network 165 can include computer networks such as the internet, local, wide, metro or other area networks, intranets, satellite networks, other computer networks such as voice or data mobile phone communication networks, and combinations thereof.

The network 165 can include or constitute a display network, e.g., a subset of information resources available on the internet that are associated with a content placement or search engine results system, or that are eligible to include third party content items as part of a content item placement campaign. The network 165 can be used by the data processing system 105 to access information resources such as web pages, web sites, domain names, or uniform resource locators that can be presented, output, rendered, or displayed by the client computing device 150. For example, via the network 165 a user of the client computing device 150 can access information or data provided by the data processing system 105, the content provider computing device 155 or the service provider computing device 160.

The network 165 can include, for example a point-to-point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network or a wireline network, and combinations thereof. The network 165 can include a wireless link, such as an infrared channel or satellite band. The topology of the network 165 may include a bus, star, or ring network topology. The network 165 can include mobile telephone networks using any protocol or protocols used to communicate among mobile devices, including advanced mobile phone protocol ("AMPS"), time division multiple access ("TDMA"), code-division multiple access ("CDMA"), global system for mobile communication ("GSM"), general packet radio services ("GPRS") or universal mobile telecommunications system ("UMTS"). Different types of data may be transmitted via different protocols, or the same types of data may be transmitted via different protocols.

The client computing device 150, the content provider computing device 155, and the service provider computing device 160 can each include at least one logic device such as a computing device having a processor to communicate with each other or with the data processing system 105 via the network 165. The client computing device 150, the content provider computing device 155, and the service provider computing device 160 can each include at least one server, processor or memory, or a plurality of computation resources or servers located in at least one data center. The client computing device 150, the content provider computing device 155, and the service provider computing device 160 can each include at least one computing device such as a desktop computer, laptop, tablet, personal digital assistant, smartphone, portable computer, server, thin client computer, virtual server, or other computing device.

The client computing device 150 can include at least one sensor 151, at least one transducer 152, at least one audio driver 153, and at least one speaker 154. The sensor 151 can include a microphone or audio input sensor. The transducer 152 can convert the audio input into an electronic signal, or vice-versa. The audio driver 153 can include a script or program executed by one or more processors of the client computing device 150 to control the sensor 151, the transducer 152 or the audio driver 153, among other components of the client computing device 150 to process audio input or provide audio output. The speaker 154 can transmit the audio output signal.

The client computing device 150 can be associated with an end user that enters voice queries as audio input into the client computing device 150 (via the sensor 151) and receives audio output in the form of a computer generated voice that can be provided from the data processing system 105 (or the content provider computing device 155 or the service provider computing device 160) to the client computing device 150, output from the speaker 154. The audio output can correspond to an action data structure received from the direct action API 135, or a content item selected by the content selector component 125. The computer generated voice can include recordings from a real person or computer generated language.

The content provider computing device 155 (or the data processing system 105 or service provider computing device 160) can provide audio based content items or action data structures for display by the client computing device 150 as an audio output. The action data structure or content item can include an organic response or offer for a good or service, such as a voice based message that states: "Today it will be sunny and 80 degrees at the beach" as an organic response to a voice-input query of "Is today a beach day?". The data processing system 105 (or other system 100 component such as the content provider computing device 155 can also provide a content item as a response, such as a voice or text message based content item offering sunscreen.

The content provider computing device 155 or the data repository 145 can include memory to store a series of audio action data structures or content items that can be provided in response to a voice based query. The action data structures and content items can include packet based data structures for transmission via the network 165. The content provider computing device 155 can also provide audio or text based content items (or other content items) to the data processing system 105 where they can be stored in the data repository 145. The data processing system 105 can select the audio action data structures or text based content items and provide (or instruct the content provider computing device 155 to provide) them to the same or different client computing devices 150 responsive to a query received from one of those client computing device 150. The audio based action data structures can be exclusively audio or can be combined with text, image, or video data. The content items can be exclusively text or can be combined with audio, image or video data.

The service provider computing device 160 can include at least one service provider natural language processor (NLP) component 161 and at least one service provider interface 162. The service provider NLP component 161 (or other components such as a direct action API of the service provider computing device 160) can engage with the client computing device 150 (via the data processing system 105 or bypassing the data processing system 105) to create a back-and-forth real-time voice or audio based conversation (e.g., a session) between the client computing device 150 and the service provider computing device 160. For example, the service provider interface 162 can receive or provide data messages (e.g., action data structures or content items) to the direct action API 135 of the data processing system 105. The direct action API 135 can also generate the action data structures independent from or without input from the service provider computing device 160. The service provider computing device 160 and the content provider computing device 155 can be associated with the same entity. For example, the content provider computing device 155 can create, store, or make available content items for beach relates services, such as sunscreen, beach towels or bathing suits, and the service provider computing device 160 can establish a session with the client computing device 150 to respond to a voice input query about the weather at the beach, directions for a beach, or a recommendation for an area beach, and can provide these content items to the end user of the client computing device 150 via an interface of the same client computing device 150 from which the query was received, a different interface of the same client computing device 150, or an interface of a different client computing device. The data processing system 105, via the direct action API 135, the NLP component 110 or other components can also establish the session with the client computing device, including or bypassing the service provider computing device 160, to for example to provide an organic response to a query related to the beach.

The data repository 145 can include one or more local or distributed databases, and can include a database management system. The data repository 145 can include computer data storage or memory and can store one or more parameters 146, one or more policies 147, content data 148, or templates 149 among other data. The parameters 146, policies 147, and templates 149 can include information such as rules about a voice based session between the client computing device 150 and the data processing system 105 (or the service provider computing device 160). The content data 148 can include content items for audio output or associated metadata, as well as input audio messages that can be part of one or more communication sessions with the client computing device 150.

The system 100 can optimize processing of action data structures and content items in a voice activated data packet (or other protocol) environment. For example, the data processing system 105 can include or be part of a voice activated assistant service, voice command device, intelligent personal assistant, knowledge navigator, event planning, or other assistant program. The data processing system 105 can provide one or more instances of action data structures as audio output for display from the client computing device 150 to accomplish tasks related to an input audio signal. For example, the data processing system can communicate with the service provider computing device 160 or other third party computing devices to generate action data structures with information about a beach, among other things. For example, an end user can enter an input audio signal into the client computing device 150 of: "OK, I would like to go to the beach this weekend" and an action data structure can indicate the weekend weather forecast for area beaches, such as "it will be sunny and 80 degrees at the beach on Saturday, with high tide at 3 pm."

The action data structures can include a number of organic or non-sponsored responses to the input audio signal. For example, the action data structures can include a beach weather forecast or directions to a beach. The action data structures in this example include organic, or non-sponsored content that is directly responsive to the input audio signal. The content items responsive to the input audio signal can include sponsored or non-organic content, such as an offer to buy sunscreen from a convenience store located near the beach. In this example, the organic action data structure (beach forecast) is responsive to the input audio signal (a query related to the beach), and the content item (a reminder or offer for sunscreen) is also responsive to the same input audio signal. The data processing system 105 can evaluate system 100 parameters (e.g., power usage, available displays, formats of displays, memory requirements, bandwidth usage, power capacity or time of input power (e.g., internal battery or external power source such as a power source from a wall output) to provide the action data structure and the content item to different candidate interfaces on the same client computing device 150, or to different candidate interfaces on different client computing devices 150.

The data processing system 105 can include an application, script or program installed at the client computing device 150, such as an app to communicate input audio signals (e.g., as data packets via a packetized or other protocol based transmission) to at least one interface 115 of the data processing system 105 and to drive components of the client computing device 150 to render output audio signals (e.g., for action data structures) or other output signals (e.g., content items). The data processing system 105 can receive data packets or other signal that includes or identifies an audio input signal. For example, the data processing system 105 can execute or run the NLP component 110 to receive the audio input signal.

The NLP component 110 can convert the audio input signal into recognized text by comparing the input signal against a stored, representative set of audio waveforms (e.g., in the data repository 145) and choosing the closest matches. The representative waveforms are generated across a large set of users, and can be augmented with speech samples. After the audio signal is converted into recognized text, the NLP component 110 can match the text to words that are associated, for example via training across users or through manual specification, with actions that the data processing system 105 can serve.

The audio input signal can be detected by the sensor 151 (e.g., a microphone) of the client computing device. Via the transducer 152, the audio driver 153, or other components the client computing device 150 can provide the audio input signal to the data processing system 105 (e.g., via the network 165) where it can be received (e.g., by the interface 115) and provided to the NLP component 110 or stored in the data repository 145 as content data 148.

The NLP component 110 can receive or otherwise obtain the input audio signal. From the input audio signal, the NLP component 110 can identify at least one request or at least one trigger keyword corresponding to the request. The request can indicate intent or subject matter of the input audio signal. The trigger keyword can indicate a type of action likely to be taken. For example, the NLP component 110 can parse the input audio signal to identify at least one request to go to the beach for the weekend. The trigger keyword can include at least one word, phrase, root or partial word, or derivative indicating an action to be taken. For example, the trigger keyword "go" or "to go to" from the input audio signal can indicate a need for transport or a trip away from home. In this example, the input audio signal (or the identified request) does not directly express an intent for transport, however the trigger keyword indicates that transport is an ancillary action to at least one other action that is indicated by the request.

The prediction component 120 (or other mechanism of the data processing system 105) can generate, based on the request or the trigger keyword, at least one action data structure associated with the input audio signal. The action data structure can indicate information related to subject matter of the input audio signal. The action data structure can include one or more than one action, such as organic responses to the input audio signal. For example, the input audio signal "OK, I would like to go to the beach this weekend" can include at least one request indicating an interest for a beach weather forecast, surf report, or water temperature information, and at least one trigger keyword, e.g., "go" indicating travel to the beach, such as a need for items one may want to bring to the beach, or a need for transportation to the beach. The prediction component 120 can generate or identify subject matter for at least one action data structure, an indication of a request for a beach weather forecast, as well as subject matter for a content item, such as an indication of a query for sponsored content related to spending a day at a beach. From the request or the trigger keyword the prediction component 120 (or other system 100 component such as the NLP component 110 or the direct action API 135) predicts, estimates, or otherwise determines subject matter for action data structures or for content items. From this subject matter, the direct action API 135 can generate at least one action data structure and can communicate with at least one content provider computing device 155 to obtain at least one content item 155. The prediction component 120 can access the parameters 146 or policies 147 in the data repository 145 to determine or otherwise estimate requests for action data structures or content items. For example, the parameters 146 or policies 147 could indicate requests for a beach weekend weather forecast action or for content items related to beach visits, such as a content item for sunscreen.

The content selector component 125 can obtain indications of any of the interest in or request for the action data structure or for the content item. For example, the prediction component 120 can directly or indirectly (e.g., via the data repository 145) provide an indication of the action data structure or content item to the content selector component 125. The content selector component 125 can obtain this information from the data repository 145, where it can be stored as part of the content data 148. The indication of the action data structure can inform the content selector component 125 of a need for area beach information, such as a weather forecast or products or services the end user may need for a trip to the beach.

From the information received by the content selector component 125, e.g., an indication of a forthcoming trip to the beach, the content selector component 125 can identify at least one content item. The content item can be responsive or related to the subject matter of the input audio query. For example, the content item can include data message identifying as tore near the beach that has sunscreen, or offering a taxi ride to the beach. The content selector component 125 can query the data repository 145 to select or otherwise identify the content item, e.g., from the content data 148. The content selector component 125 can also select the content item from the content provider computing device 155. For example responsive to a query received from the data processing system 105, the content provider computing device 155 can provide a content item to the data processing system 105 (or component thereof) for eventual output by the client computing device 150 that originated the input audio signal, or for output to the same end user by a different client computing device 150.

The audio signal generator component 130 can generate or otherwise obtain an output signal that includes the content item (as well as the action data structure) responsive to the input audio signal. For example, the data processing system 105 can execute the audio signal generator component 130 to generate or create an output signal corresponding to the action data structure or to the content item. The interface component 115 of the data processing system 105 can provide or transmit one or more data packets that include the output signal via the computer network 165 to any client computing device 150. The interface 115 can be designed, configured, constructed, or operational to receive and transmit information using, for example, data packets. The interface 115 can receive and transmit information using one or more protocols, such as a network protocol. The interface 115 can include a hardware interface, software interface, wired interface, or wireless interface. The interface 115 can facilitate translating or formatting data from one format to another format. For example, the interface 115 can include an application programming interface that includes definitions for communicating between various components, such as software components of the system 100.

The data processing system 105 can provide the output signal including the action data structure from the data repository 145 or from the audio signal generator component 130 to the client computing device 150. The data processing system 105 can provide the output signal including the content item from the data repository 145 or from the audio signal generator component 130 to the same or to a different client computing device 150.

The data processing system 105 can also instruct, via data packet transmissions, the content provider computing device 155 or the service provider computing device 160 to provide the output signal (e.g., corresponding to the action data structure or to the content item) to the client computing device 150. The output signal can be obtained, generated, transformed to or transmitted as one or more data packets (or other communications protocol) from the data processing system 105 (or other computing device) to the client computing device 150.

The content selector component 125 can select the content item or the action data structure for the as part of a real-time content selection process. For example, the action data structure can be provided to the client computing device 150 for transmission as audio output by an interface of the client computing device 150 in a conversational manner in direct response to the input audio signal. The real-time content selection process to identify the action data structure and provide the content item to the client computing device 150 can occur within one minute or less from the time of the input audio signal and be considered real-time. The data processing system 105 can also identify and provide the content item to at least one interface of the client computing device 150 that originated the input audio signal, or to a different client computing device 150.

The action data structure (or the content item), for example obtained or generated by the audio signal generator component 130 transmitted via the interface 115 and the computer network 165 to the client computing device 150, can cause the client computing device 150 to execute the audio driver 153 to drive the speaker 154 to generate an acoustic wave corresponding to the action data structure or to the content item. The acoustic wave can include words of or corresponding to the action data structure or content item.

The acoustic wave representing the action data structure can be output from the client computing device 150 separately from the content item. For example, the acoustic wave can include the audio output of "Today it will be sunny and 80 degrees at the beach." In this example, the data processing system 105 obtains the input audio signal of, for example, "OK, I would like to go to the beach this weekend." From this information the NLP component 110 identifies at least one request or at least one trigger keyword, and the prediction component 120 uses the request(s) or trigger keyword(s) to identify a request for an action data structure or for a content item. The content selector component 125 (or other component) can identify, select, or generate a content item for, e.g., sunscreen available near the beach. The direct action API 135 (or other component) can identify, select, or generate an action data structure for, e.g., the weekend beach forecast. The data processing system 105 or component thereof such as the audio signal generator component 130 can provide the action data structure for output by an interface of the client computing device 150. For example, the acoustic wave corresponding to the action data structure can be output from the client computing device 150. The data processing system 105 can provide the content item for output by a different interface of the same client computing device 150 or by an interface of a different client computing device 150.

The packet based data transmission of the action data structure by data processing system 105 to the client computing device 150 can include a direct or real-time response to the input audio signal of "OK, I would like to go to the beach this weekend" so that the packet based data transmissions via the computer network 165 that are part of a communication session between the data processing system 105 and the client computing device 150 with the flow and feel of a real-time person to person conversation. This packet based data transmission communication session can also include the content provider computing device 155 or the service provider computing device 160.

The content selector component 125 can select the content item or action data structure based on at least one request or at least one trigger keyword of the input audio signal. For example, the requests of the input audio signal "OK, I would like to go to the beach this weekend" can indicate subject matter of the beach, travel to the beach, or items to facilitate a trip to the beach. The NLP component 110 or the prediction component 120 (or other data processing system 105 components executing as part of the direct action API 135) can identify the trigger keyword "go" "go to" or "to go to" and can determine a transportation request to the beach based at least in part on the trigger keyword. The NLP component 110 (or other system 100 component) can also determine a solicitation for content items related to beach activity, such as for sunscreen or beach umbrellas. Thus, the data processing system 105 can infer actions from the input audio signal that are secondary requests (e.g., a request for sunscreen) that are not the primary request or subject of the input audio signal (information about the beach this weekend).

The action data structures and content items can correspond to subject matter of the input audio signal. The direct action API 135 can execute programs or scripts, for example from the NLP component 110, the prediction component 120, or the content selector component 125 to identify action data structures or content items for one or more of these actions. The direct action API 135 can execute a specified action to satisfy the end user's intention, as determined by the data processing system 105. Depending on the action specified in its inputs, the direct action API 135 can execute code or a dialog script that identifies the parameters required to fulfill a user request. Such code can lookup additional information, e.g., in the data repository 145, such as the name of a home automation service, or it can provide audio output for rendering at the client computing device 150 to ask the end user questions such as the intended destination of a requested taxi. The direct action API 135 can determine necessary parameters and can package the information into an action data structure, which can then be sent to another component such as the content selector component 125 or to the service provider computing device 160 to be fulfilled.

The direct action API 135 of the data processing system 105 can generate, based on the request or the trigger keyword, the action data structures. The action data structures can be generated responsive to the subject matter of the input audio signal. The action data structures can be included in the messages that are transmitted to or received by the service provider computing device 160. Based on the audio input signal parsed by the NLP component 110, the direct action API 135 can determine to which, if any, of a plurality of service provider computing devices 160 the message should be sent. For example, if an input audio signal includes "OK, I would like to go to the beach this weekend," the NLP component 110 can parse the input audio signal to identify requests or trigger keywords such as the trigger keyword word "to go to" as an indication of a need for a taxi. The direct action API 135 can package the request into an action data structure for transmission as a message to a service provider computing device 160 of a taxi service. The message can also be passed to the content selector component 125. The action data structure can include information for completing the request. In this example, the information can include a pick up location (e.g., home) and a destination location (e.g., a beach). The direct action API 135 can retrieve a template 149 from the data repository 145 to determine which fields to include in the action data structure. The direct action API 135 can retrieve content from the data repository 145 to obtain information for the fields of the data structure. The direct action API 135 can populate the fields from the template with that information to generate the data structure. The direct action API 135 can also populate the fields with data from the input audio signal. The templates 149 can be standardized for categories of service providers or can be standardized for specific service providers. For example, ride sharing service providers can use the following standardized template 149 to create the data structure: {client_device_identifier; authentication_credentials; pick_up_location; destination_location; no_passengers; service_level}.

The content selector component 125 can identify, select, or obtain multiple content items resulting from a multiple content selection processes. The content selection processes can be real-time, e.g., part of the same conversation, communication session, or series of communications sessions between the data processing system 105 and the client computing device 150 that involve common subject matter. The conversation can include asynchronous communications separated from one another by a period of hours or days, for example. The conversation or communication session can last for a time period from receipt of the first input audio signal until an estimated or known conclusion of a final action related to the first input audio signal, or receipt by the data processing system 105 of an indication of a termination or expiration of the conversation. For example, the data processing system 105 can determine that a conversation related to a weekend beach trip begins at the time or receipt of the input audio signal and expires or terminates at the end of the weekend, e.g., Sunday night or Monday morning. The data processing system 105 that provides action data structures or content items for rendering by one or more interfaces of the client computing device 150 or of another client computing device 150 during the active time period of the conversation (e.g., from receipt of the input audio signal until a determined expiration time) can be considered to be operating in real-time. In this example the content selection processes and rendering of the content items and action data structures occurs in real time.

The interface management component 140 can poll, determine, identify, or select interfaces for rendering of the action data structures and of the content items related to the input audio signal. For example, the interface management component 140 can identify one or more candidate interfaces of client computing devices 150 associated with an end user that entered the input audio signal (e.g., "What is the weather at the beach today?") into one of the client computing devices 150 via an audio interface. The interfaces can include hardware such as sensor 151 (e.g., a microphone), speaker 154, or a screen size of a computing device, alone or combined with scripts or programs (e.g., the audio driver 153) as well as apps, computer programs, online documents (e.g., webpage) interfaces and combinations thereof.

The interfaces can include social media accounts, text message applications, or email accounts associated with an end user of the client computing device 150 that originated the input audio signal. Interfaces can include the audio output of a smartphone, or an app based messaging device installed on the smartphone, or on a wearable computing device, among other client computing devices 150. The interfaces can also include display screen parameters (e.g., size, resolution), audio parameters, mobile device parameters, (e.g., processing power, battery life, existence of installed apps or programs, or sensor 151 or speaker 154 capabilities), content slots on online documents for text, image, or video renderings of content items, chat applications, laptops parameters, smartwatch or other wearable device parameters (e.g., indications of their display or processing capabilities), or virtual reality headset parameters.

The interface management component 140 can poll a plurality of interfaces to identify candidate interfaces. Candidate interfaces include interfaces having the capability to render a response to the input audio signal, (e.g., the action data structure as an audio output, or the content item that can be output in various formats including non-audio formats). The interface management component 140 can determine parameters or other capabilities of interfaces to determine that they are (or are not) candidate interfaces. For example, the interface management component 140 can determine, based on parameters 146 of the content item or of a first client computing device 150 (e.g., a smartwatch wearable device), that the smartwatch includes an available visual interface of sufficient size or resolution to render the content item. The interface management component 140 can also determine that the client computing device 150 that originated the input audio signal has a speaker 154 hardware and installed program e.g., an audio driver or other script to render the action data structure.

The interface management component 140 can determine utilization values for candidate interfaces. The utilization values can indicate that a candidate interface can (or cannot) render the action data structures or the content items provided in response to input audio signals. The utilization values can include parameters 146 obtained from the data repository 145 or other parameters obtained from the client computing device 150, such as bandwidth or processing utilizations or requirements, processing power, power requirements, battery status, memory utilization or capabilities, or other interface parameters that indicate the available of an interface to render action data structures or content items. The battery status can indicate a type of power source (e.g., internal battery or external power source such as via an output), a charging status (e.g., currently charging or not), or an amount of remaining battery power. The interface management component 140 can select interfaces based on the battery status or charging status.

The interface management component 140 can order the candidate interfaces in a hierarchy or ranking based on the utilization values. For example different utilization values (e.g., processing requirements, display screen size, accessibility to the end user) can be given different weights. The interface management component 140 can rank one or more of the utilization values of the candidate interfaces based on their weights to determine an optimal corresponding candidate interface for rendering of the content item (or action data structure). Based on this hierarchy, the interface management component 140 can select the highest ranked interface for rendering of the content item.

Based on utilization values for candidate interfaces, the interface management component 140 can select at least one candidate interface as a selected interface for the content item. The selected interface for the content item can be the same interface from which the input audio signal was received (e.g., an audio interface of the client computing device 150) or a different interface (e.g., a text message based app of the same client computing device 150, or an email account accessible from the same client computing device 150.

The interface management component 140 can select an interface for the content item that is an interface of a different client computing device 150 than the device that originated the input audio signal. For example, the data processing system 105 can receive the input audio signal from a first client computing device 150 (e.g., a smartphone), and can select an interface such as a display of a smartwatch (or any other client computing device for rendering of the content item. The multiple client computing devices 150 can all be associated with the same end user. The data processing system 105 can determine that multiple client computing devices 150 are associated with the same end user based on information received with consent from the end user such as user access to a common social media or email account across multiple client computing devices 150.

The interface management component 140 can also determine that an interface is unavailable. For example the interface management component 140 can poll interfaces and determine that a battery status of a client computing device 150 associated with the interface is low, or below a threshold level such as 10%. Or the interface management component 140 can determine that the client computing device 150 associated with the interface lacks sufficient display screen size or processing power to render the content item, or that the processor utilization rate is too high, as the client computing device is currently executing another application, for example to stream content via the network 165. In these and other examples the interface management component 140 can determine that the interface is unavailable and can eliminate the interface as a candidate for rendering the content item or the action data structure.

Thus, the interface management component 140 can determine that a candidate interface accessible by the first client computing device 150 is linked to an account of an end user, and that a second candidate interface accessible by a second client computing device 150 is also linked to the same account. For example, both client computing devices 150 may have access to the same social media account, e.g., via installation of an app or script at each client computing device 150. The interface management component 140 can also determine that multiple interfaces correspond to the same account, and can provide multiple, different content items to the multiple interfaces corresponding to the common account. For example, the data processing system 105 can determine, with end user consent, that an end user has accessed an account from different client computing devices 150. These multiple interfaces can be separate instances of the same interface (e.g., the same app installed on different client computing devices 150) or different interfaces such as different apps for different social media accounts that are both linked to a common email address account, accessible from multiple client computing devices 150.

The interface management component 140 can also determine or estimate distances between client computing devices 150 associated with candidate interfaces. For example, the data processing system 105 can obtain, with user consent, an indication that the input audio signal originated from a smartphone or virtual reality headset computing device 150, and that the end user is associated with an active smartwatch client computing device 150. From this information the interface management component can determine that the smartwatch is active, e.g., being worn by the end user when the end user enters the input audio signal into the smartphone, so that the two client computing devices 150 are within a threshold distance of one another (e.g., within 1 meter, 2 meters, 3 meters, 4 meters, or 7 meters; or within audio range or visual range). The data processing system 105 can determine, with end user consent, the location of a smartphone that is the source of an input audio signal, and can also determine that a laptop account associated with the end user is currently active. For example, the laptop can be signed into a social media account indicating that the user is currently active on the laptop. In this example the data processing system 105 can determine that the end user is within a threshold distance of the smartphone and of the laptop, so that the laptop can be an appropriate choice for rendering of the content item via a candidate interface.

The interface management component 140 can determine to select an interface, device, speaker or display to present the action data structure or a content item selected for the action data structure. The interface management component 140 can determine to select one or more interfaces, one or more devices, or one or more displays, or one or more speakers to present the action data structure or the content item. The interface management component 140 can copy, split up, or device the action data structure or the content item into multiple components, and then present the multiple components on different interfaces, devices, displays, or speakers.

For example, the interface management component 140 can identify one or more other computing devices 150 that are within a threshold distance of the computing device 150 that receives the input audio signal, and then poll candidate interfaces associated with the computing devices 150 that are within the threshold distance of the computing device 150. The interface management component 140 can be configured with one or more proximity detection techniques to identify the computing devices 150 that are within the threshold distance of the computing device 150 that receives the input audio signal. Proximity detection techniques can include, for example, a sub-audible wave technique, WIFI-based technique, Bluetooth-based technique, matching input audio signal-based technique, or a token-based technique. WIFI (or Wi-Fi) can refer to a technology for wireless local area networking with computing devices based on a standard. In some cases, to identify the devices or interfaces within the threshold distance, the data processing system 105 can use a sub-audible wave. The data processing system 105 can identify the devices based on the devices being linked to an account, and the profile for the account can indicate the location of the devices or interface, such as in a living room.

The data processing system 105 (e.g., via interface management component 140) can identify a first action data structure and a second action data structure. The data processing system 105 can identify the first and second action data structures responsive to a query input into a digital assistant (e.g., via a voice-based digital assistant executing at least partially on the client computing device 150). The data processing system 105 can, responsive to the voice-based query, identify two responses. The first response can be a first action data structure, and the second response can be a second action data structure. The responses can include any data set, data component object, content item, multimedia item, application, or information that is responsive to the query. For example, the query can be "show me my day", and the response to the query can include a first action data structure that includes one or more calendar entries for the current day, and the second action data structure can include a weather report for the day. The data processing system 105 can generate additional action data structures, such as a third action data structure comprising a traffic estimate to commute from a first location to a second location (e.g., home to work), or a fourth action data structure comprising new electronic messages, or a fifth action data structure comprising news headlines.

The data processing system 105 can determine to present the different action data structures on different devices or interfaces. The data processing system 105 can determine to select different devices or interfaces to which to transmit the action data structure for execution, rendering, outputting, or playback. To do so, the data processing system 105 can identify the available devices, identify resource utilization of the devices, or identify capability or functionality of the devices. The data processing system 105 can use a machine learning engine or technique to select the optimal device based on format of the action data structure, context of the action data structure, user preference for interface for the type of action data structure, output of the device, time of day, content of the action data structure, or resource utilization of the device. The machine learning technique can be trained based on user requests for specific devices, or based on aggregated training data from a plurality of users or queries. The data processing system 105 can select the interface or device based on historical selection information.

The data processing system 105 can utilize a map data structure 164 that maps categories of action data structures or content items to types of interfaces or devices. The map data structure 164 stored in the data repository 145 can include a mapping of category of action data structure or content item to a type of interface or device type. For example, the category of the first action data structure comprising calendar entries can be: calendar; the category of the second action data structure comprising the weather forecast can be: weather; the category of the third action data structure comprising traffic estimate can be: traffic; the category of the fourth action data structure comprising electronic messages can be: messages; the category of the fifth action can be: news; and the category of the sixth action can be: photos or videos. These category of action data structure can also be used to refer to categories of content items (e.g., category of content item can be calendar, weather, traffic, messages, news, photos or videos).

Interface types can include visual display, audio display, still image, or video. Interface types can further include or indicate a characteristic or quality of the display. For example, screen size of the display, resolution of the display, decibels of the speaker, number of speakers, or surround sound capability. Device type can include computer, laptop, tablet, smart speaker, television, set top box, wearable device, mobile smartphone, smart watch, or smart glasses.

The data processing system 105 can receive the map data structure 164 from an administrator of the data processing system 105. A user of the computing device 150 can establish the map data structure. The data processing system 105 can generate the map data structure. The data processing system 105 can store a default or predetermined map data structure. The data processing system 105 can receive feedback or input from one or more users to update the map data structure 164. The data processing system 105 can have a custom map data structure for an account of an user. For example, each account can include a customized map data structure for the account that can be based on preferences or profile information for the account. The data processing system 105 can generate the map data structure using a machine learning technique. For example, the data processing system 105 can determine which features associated with the action data structure, interface type, or device type correlate with a desired feedback value or performance. For example, feedback can be in the form of the user providing an indication that the selected interface facilitated the presentation of the action data structure, or feedback can be in the form of the user requesting the same interface for the type of action data structure, or feedback can be in the form of the user interacting with the interface to manipulate or consume the action data structure.

Table 1 illustrates an example map data structure 164:

TABLE 1

Illustrative example of a map data structure that maps categories to interface or device types.

| Category | Type of Interface or Device |
|---|---|
| Calendar | mobile display |
| weather | television display |
| traffic estimate | speaker |
| electronic messages | tablet computing device |
| news | laptop computing device |
| photos | television display |

The map data structure 164 can further include a mapping to specific computing device identifiers that are linked with an account. The computing device identifiers can refer to MAC addresses, IP address, or other unique identifier that can facilitate transmitting an action data structure, content item, or data component to the selected device or interface for presentation.

Using the map data structure, the data processing system 105 can, for example, select a first computing device having a first interface to present the first action data structure, and then select a second computing device having a second interface to present the second action data structure. For example, responsive to the query "my day", the data processing system 105 can select a mobile smartphone to display calendar entries, and then select a nearby laptop computer to present a video clip of the news.

The data processing system 105 can select the interface based on an output type of the action data structure corresponding to a type of the interface in a map data structure. The output type can relate to the For example, Table 2 is illustrates a map data structure relating output types to interface types:

TABLE 2

Illustrative example of a map data structure that maps output types to interface or device types.

| Output type | Interface type |
|---|---|
| visual only | display |
| audio only | speaker |
| audio visual | display connected to speaker |

The data processing system 105, via the content selector component 125, can select, identify, determine or otherwise obtain a content item. The data processing system 105 can select the content item via a real-time content selection process. The data processing system 105 can identify content items for each of the one or more action data structures that are generated responsive to a single voice action query received by the digital assistant or client computing device 150. For example, the data processing system 105 can determine a first content item for the first action data structure, and determine a second content item for the second action data structure. The data processing system 105 can select a first interface for the first action data structure and first content item, and then select a second interface for the second action data structure and second content item.

The interface management component 140 can transmit the first action data structure and first content item to a first interface, and transmit the second action data structure and second content item to a second interface for presentation.

The interface management component 140 can determine that the first action data structure itself corresponds to multiple categories. For example, the first action data structure can be responsive to a voice-based input query and correspond to multiple categories or a single category. The interface management component 140 can determine to split up or divide the action data structure into multiple data sets or data component objects for the purpose of presenting the action data structure on multiple interfaces of devices. For example, the action data structure can include multiple news articles, and the data processing system 105 can determine to spread the multiple news articles for presentation on different displays. In another example, the action data structure can be generated to include a calendar entry, electronic message, and weather forecast. This single action data structure that is responsive to the single input query can then be split or divided by the data processing system 105 to three different data objects as follows: first data object includes the calendar entry; second data object includes the electronic message; and the third data object includes the weather forecast. The data processing system 105 (e.g., interface management component 140) can select three different interfaces or devices to present the three data objects as follows: first data object transmitted to first interface; second data object transmitted to second interface; and third data object transmitted to third interface. The data processing system 105 can use the map data structure to select the interfaces, for example. Thus, the data processing system 105 can split the first action data structure into a plurality of action data structures, and then transmit the plurality of action data structures to a plurality of candidate interfaces for presentation.

The data processing system 105 can receive requests or an indication as to which interface to select to present the action data structure or content item. However, and in some cases, the data processing system 105 can determine to override the request or indication and select a different interface or device type. For example, the data processing system 105 can receive a request to display photos on a mobile device as follows "show me my vacation photos on my smartphone". The data processing system 105 can determine, by polling devices or identifying devices linked to the account of the smartphone that are within a threshold distance, that there is a television display that is not being utilized. The data processing system 105 can generate a prompt indicating that the photos can be displayed on the television display and suggest that the photos be presented on the television display. The data processing system 105 can then receive an indication that approves the suggestion to display the photos on the television display. The data processing system 105, therefore, can then override the initial request by transmitting the photos to the television display for presentation. In some cases, the data processing system 105 can override the initial request with or without generating a prompt to approve the override. The data processing system 105 can generate the prompt with a countdown time that automatically overrides the requested interface with the suggested interface unless the data processing system 105 receives a command to block or prevent the override. For example, the prompt can state "showing vacation photos on your tv instead of your smartphone in 5 seconds, unless canceled now." Thus, the data processing system 105 can receive a command to block the override.

The data processing system 105 can receive a request to present the first action data structure via the second candidate interface. The data processing system 105 can determine that a category of the first action data structure corresponds to the first candidate interface in a map data structure. The data processing system 105 can override the request responsive to the determination based on the map data structure. The data processing system 105 can select the first candidate interface to present the first action data structure responsive to the determination to override the request.

For example, the data processing system 105 can receive a request to present the first action data structure via the second candidate interface. The data processing system 105 can determine that an output type of the first content item selected for the first action data structure corresponds to the first candidate interface in a map data structure. The data processing system 105 can override the request responsive to the determination based on the map data structure. The data processing system 105 can select the first candidate interface to present the first action data structure and the first content item responsive to the determination to override the request. In some cases, the data processing system 105 can override the request based on historical interfaces used to present action data structures having the category or the output type. For example, if the account is associated with historically overriding the suggested interface for a specific category or type of content or type of query, the data processing system 105 can identify the historical override, and then apply it to the present action data structure that is responsive to the input query. If, however, the account is associated with historically blocking or preventing an override for this type of query action data structure or requested interface, the data processing system 105 can determine to block an override.

The interface management component 140 can select the interface for the content item based on at least one utilization value indicating that the selected interface is the most efficient for the content item. For example, from among candidate interfaces, the interface to render the content item at the smartwatch uses the least bandwidth due as the content item is smaller and can be transmitted with fewer resources. Or the interface management component 140 can determine that the candidate interface selected for rendering of the content item is currently charging (e.g., plugged in) so that rendering of the content item by the interface will not drain battery power of the corresponding client computing device 150. In another example, the interface management component 140 can select a candidate interface that is currently performing fewer processing operations than another, unselected interface of for example a different client computing device 150 that is currently streaming video content from the network 165 and therefore less available to render the content item without delay.

The interface management component 140 (or other data processing system 105 component) can convert the content item for delivery in a modality compatible with the candidate interface. For example, if the candidate interface is a display of a smartwatch, smartphone, or tablet computing device, the interface management component 140 can size the content item for appropriate visual display given the dimensions of the display screen associated with the interface. The interface management component 140 can also convert the content item to a packet or other protocol based format, including proprietary or industry standard format for transmission to the client computing device 150 associated with the selected interface. The interface selected by the interface management component 140 for the content item can include an interface accessible from multiple client computing devices 150 by the end user. For example, the interface can be or include a social media account that the end user can access via the client computing device 150 that originated the input audio signal (e.g., a smartphone) as well as other client computing devices such as tabled or desktop computers or other mobile computing devices.

The interface management component 140 can also select at least one candidate interface for the action data structure. This interface can be the same interface from which the input audio signal was obtained, e.g., a voice activated assistant service executed at a client computing device 150. This can be the same interface or a different interface than the interface management component 140 selects for the content item. The interface management component 140 (or other data processing system 105 components) can provide the action data structure to the same client computing device 150 that originated the input audio signal for rendering as audio output as part of the assistant service. The interface management component 140 can also transmit or otherwise provide the content item to the selected interface for the content item, in any converted modality appropriate for rendering by the selected interface.

Thus, the interface management component 140 can provide the action data structure as audio output for rendering by an interface of the client computing device 150 responsive to the input audio signal received by the same client computing device 150. The interface management component 140 can also provide the content item for rendering by a different interface of the same client computing device 150 or of a different client computing device 150 associated with the same end user. For example, the action data structure, e.g., "it will be sunny and 80 degrees at the beach on Saturday" can be provided for audio rendering by the client computing device as part of an assistant program interface executing in part at the client computing device 150, and the content item e.g., a text, audio, or combination content item indicating that "sunscreen is available from the convenience store near the beach" can be provided for rendering by an interface of the same or a different computing device 150, such as an email or text message accessible by the same or a different client computing device 150 associated with the end user.

Separating the content item from the action data structure and sending the content item as, for example, a text message rather than an audio message can result in reduced processing power for the client computing device 150 that accesses the content item since, for example, text message data transmissions are less computationally intensive than audio message data transmissions. This separation can also reduce power usage, memory storage, or transmission bandwidth used to render the content item. This results in increased processing, power, and bandwidth efficiencies of the system 100 and devices such as the client computing devices 150 and the data processing system 105. This increases the efficiency of the computing devices that process these transactions, and increases the speed with which the content items can be rendered. The data processing system 105 can process thousands, tens of thousands or more input audio signals simultaneously so the bandwidth, power, and processing savings can be significant and not merely incremental or incidental.

The interface management component 140 can provide or deliver the content item to the same client computing device 150 (or a different device) as the action data structure subsequent to delivery of the action data structure to the client computing device 150. For example, the content item can be provided for rendering via the selected interface upon conclusion of audio output rendering of the action data structure. The interface management component 140 can also provide the content item to the selected interface concurrent with the provision of the action data structure to the client computing device 150. The interface management component 140 can provide the content item for delivery via the selected interface within a pre-determined time period from receipt of the input audio signal by the NLP component 110. The time period, for example, can be any time during an active length of the conversation of session. For example, if the input audio signal is "I would like to go to the beach this weekend" the pre-determined time period can be any time from receipt of the input audio signal through the end of the weekend, e.g., the active period of the conversation. The pre-determined time period can also be a time triggered from rendering of the action data structure as audio output by the client computing device 150, such as within 5 minutes, one hour or one day of this rendering.

The interface management component 140 can provide the action data structure to the client computing device 150 with an indication of the existence of the content item. For example, the data processing system 105 can provide the action data structure that renders at the client computing device 150 to provide the audio output "it will be sunny and 80 degrees at the beach on Saturday, check your email for more information." The phrase "check your email for more information" can indicate the existence of a content item, e.g., for sunscreen, provided by the data processing system 105 to an interface (e.g., email). In this example, sponsored content can be provided as content items to the email (or other) interface and organic content such as the weather can be provided as the action data structure for audio output.

The data processing system 105 can also provide the action data structure with a prompt that queries the user to determine user interest in obtaining the content item. For example, the action data structure can indicate "it will be sunny and 80 degrees at the beach on Saturday, would you like to hear about some services to assist with your trip?" The data processing system 105 can receive another audio input signal from the client computing device 150 in response to the prompt "would you like to hear about some services to assist with your trip?" such as "sure". The NLP component 110 can parse this response, e.g., "sure" and interpret it as authorization for audio rendering of the content item by the client computing device 150. In response, the data processing system 105 can provide the content item for audio rendering by the same client computing device 150 from which the response "sure" originated.

The data processing system 105 can delay transmission of the content item associated with the action data structure to optimize processing utilization. For example, the data processing system 105 provide the action data structure for rendering as audio output by the client computing device in real-time responsive to receipt of the input audio signal, e.g., in a conversational manner, and can delay content item transmission until an off-peak or non-peak period of data center usage, which results in more efficient utilization of the data center by reducing peak bandwidth usage, heat output or cooling requirements. The data processing system 105 can also initiate a conversion or other activity associated with the content item, such as ordering a car service responsive to a response to the action data structure or to the content item, based on data center utilization rates or bandwidth metrics or requirements of the network 165 or of a data center that includes the data processing system 105.

Based on a response to a content item or to the action data structure for a subsequent action, such as a click on the content item rendered via the selected interface, the data processing system 105 can identify a conversion, or initiate a conversion or action. Processors of the data processing system 105 can invoke the direct action API 135 to execute scripts that facilitate the conversion action, such as to order a car from a car share service to take the end user to or from the beach. The direct action API 135 can obtain content data 148 (or parameters 146 or policies 147) from the data repository 145, as well as data received with end user consent from the client computing device 150 to determine location, time, user accounts, logistical or other information in order to reserve a car from the car share service. Using the direct action API 135, the data processing system 105 can also communicate with the service provider computing device 160 to complete the conversion by in this example making the car share pick up reservation.

Figure 2:
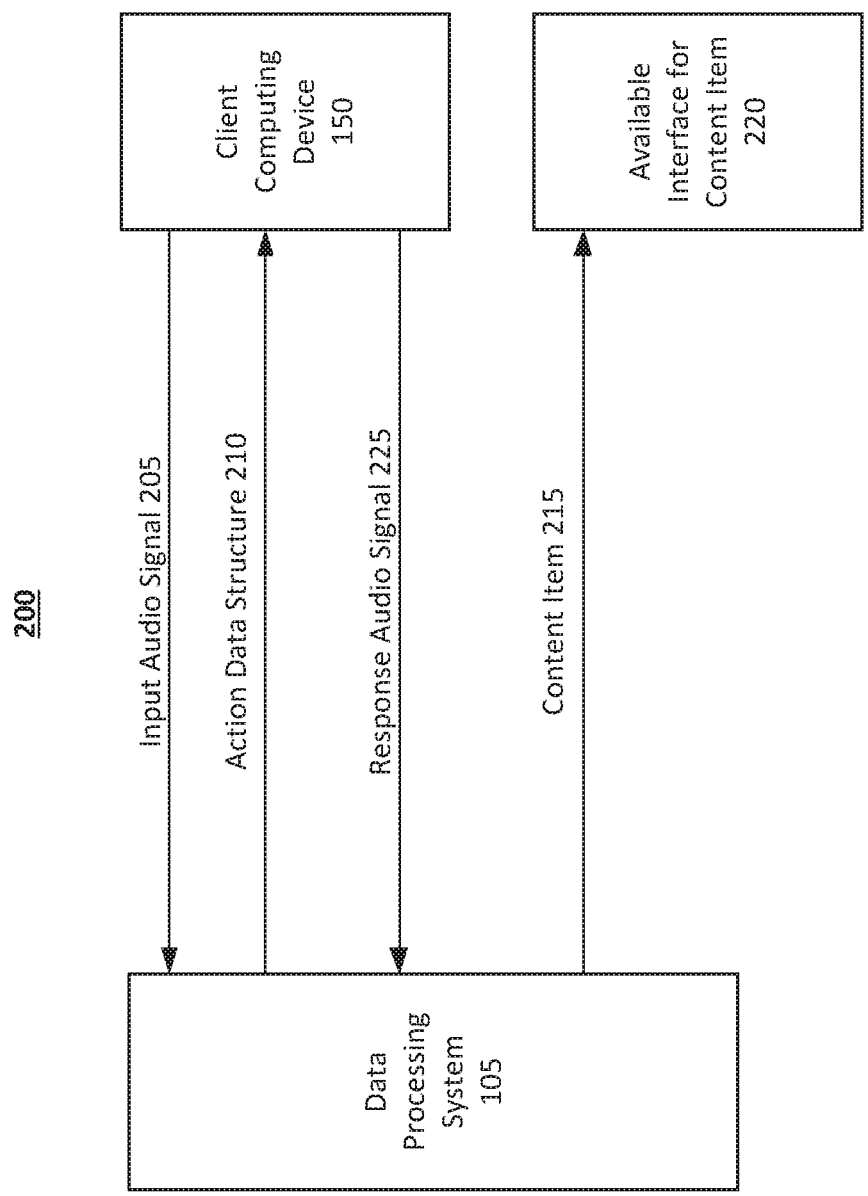
FIG. 2 depicts a flow diagram for multi-modal transmission of packetized data in a voice activated computer network environment.

FIG. 2 depicts a flow diagram 200 for multi-modal transmission of packetized data in a voice activated computer network environment. The data processing system 105 can receive the input audio signal 205, e.g., "OK, I would like to go to the beach this weekend." In response, the data processing system generates at least one action data structure 210 and at least one content item 215. The action data structure 205 can include organic or non-sponsored content, such as a response for audio rendering stating "It will be sunny and 80 degrees at the beach this weekend" or "high tide is at 3 pm." The data processing system 105 can provide the action data structure 210 to the same client computing device 150 that originated the input audio signal 205, for rendering by a candidate interface of the client computing device 150, e.g., as output in a real time or conversational manner as part of of a digital or conversational assistant platform.

The data processing system 105 can select the candidate interface 220 as a selected interface for the content item 215, and can provide the content item 215 to the selected interface 220. The content item 215 can also include a data structure, converted to the appropriate modality by the data processing system 105 for rendering by the selected interface 220. The content item 215 can include sponsored content, such as an offer to rent a beach chair for the day, or for sunscreen. The selected interface 220 can be part of or executed by the same client computing device 150 or by a different device accessible by the end user of the client computing device 150. Transmission of the action data structure 210 and the content item 215 can occur at the same time or subsequent to one another. The action data structure 210 can include an indicator that the content item 215 is being or will be transmitted separately via a different modality or format to the selected interface 200, alerting the end user to the existence of the content item 215.

The action data structure 210 and the content item 215 can be provided separately for rendering to the end user. By separating the sponsored content (content item 215) from the organic response (action data structure 210) audio or other alerts indicating that the content item 215 is sponsored do not need to be provided with the action data structure 210. This can reduce bandwidth requirements associated with transmission of the action data structure 210 via the network 165 and can simplify rendering of the action data structure 210, for example without audio disclaimer or warning messages.

The data processing system 105 can receive a response audio signal 225. The response audio signal 225 can include an audio signal such as, "great, please book me a hotel on the beach this weekend." Receipt by the data processing system 105 of the response audio signal 225 can cause the data processing system to invoke the direct action API 135 to execute a conversion to, for example, book a hotel room on the beach. The direct action API 135 can also communicate with at least one service provider computing device 160 to provide information to the service provider computing device 160 so that the service provider computing device 160 can complete or confirm the booking process.

Figure 3:
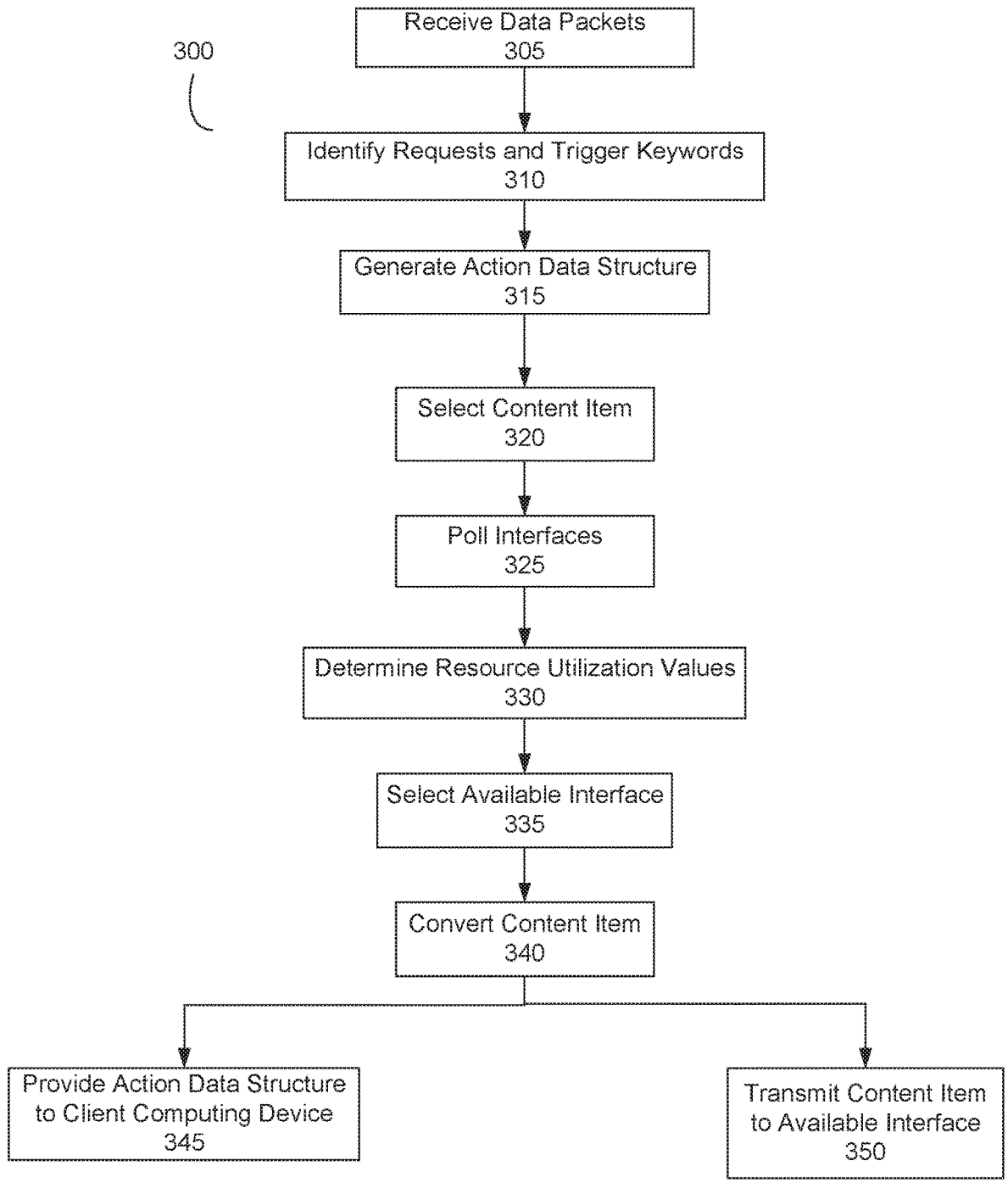
FIG. 3 depicts method of multi-modal transmission of packetized data in a voice activated computer network environment.

FIG. 3 depicts a method 300 of multi-modal transmission of packetized data in a voice activated computer network environment. The method 300 can receive data packets (ACT 305). For example, the NLP component 110, executed by the data processing system 105, can receive from the client computing device 105 data packets that include an input audio signal (ACT 305). The data packets can be received (ACT 305) via the network 165 as packet or other protocol based data transmissions. The method 300 can identify, from the input audio signal, requests or trigger keywords corresponding to the requests (ACT 310). For example, the NLP component 110 can parse the input audio signal to identify requests that relate to subject matter of the input audio signal, or to identify trigger keywords that can indicate, for example, actions associated with the requests.

The method 300 can generate at least one action data structure (ACT 315). For example, the direct action API 135 can generate action data structures (ACT 315) based on the requests or trigger keywords. The action data structures can indicate organic or non-sponsored content related to the input audio signal. The method 300 can select at least one content item (ACT 320). For example, the content selector component 125 can receive the request(s) or the trigger keyword(s) and based on this information can select one or more content items. The content items can include sponsored items having subject matter that relates to subject matter of the request or of the trigger keyword. The content items can be selected by the content selector component 125 via a real-time content selection process.

The method 300 can poll a plurality of interfaces to determine at least one candidate interface (ACT 325). The candidate interfaces can include candidate interfaces for rendering of the selected content item (or action data structure). For example, the interface management component 140 can query interfaces to obtain utilization values, e.g., parameter information or other characteristics about the interfaces (ACT 330). Based on the utilization values the interface management component 140 can select (ACT 335) at least one candidate interface as a selected interface for rendering of the content item (or of the action data structure). The method 300 can include converting the content item to a modality for rendering via the selected interface (ACT 340). For example the data processing system 105 or component thereof such as the interface management component 140 can convert the content item for rendering in a content item slot of an online document (e.g., for display as an email (e.g., via a selected email interface) or as a text message for display in a chat app).

The method 300 can provide the action data structure to the client computing device 150 for rendering (ACT 345) and can transmit the content item to the candidate interface selected for rendering of the content item (ACT 350). For example, via the interface 115 the interface management component 140 can provide the action data structure to the client computing device 150 for rendering as audio output responsive to the input audio signal (ACT 345). The data processing system can also transmit the content item to the selected interface on the same or a different client computing device 150 for rendering in the converted modality (ACT 350).

Figure 4:
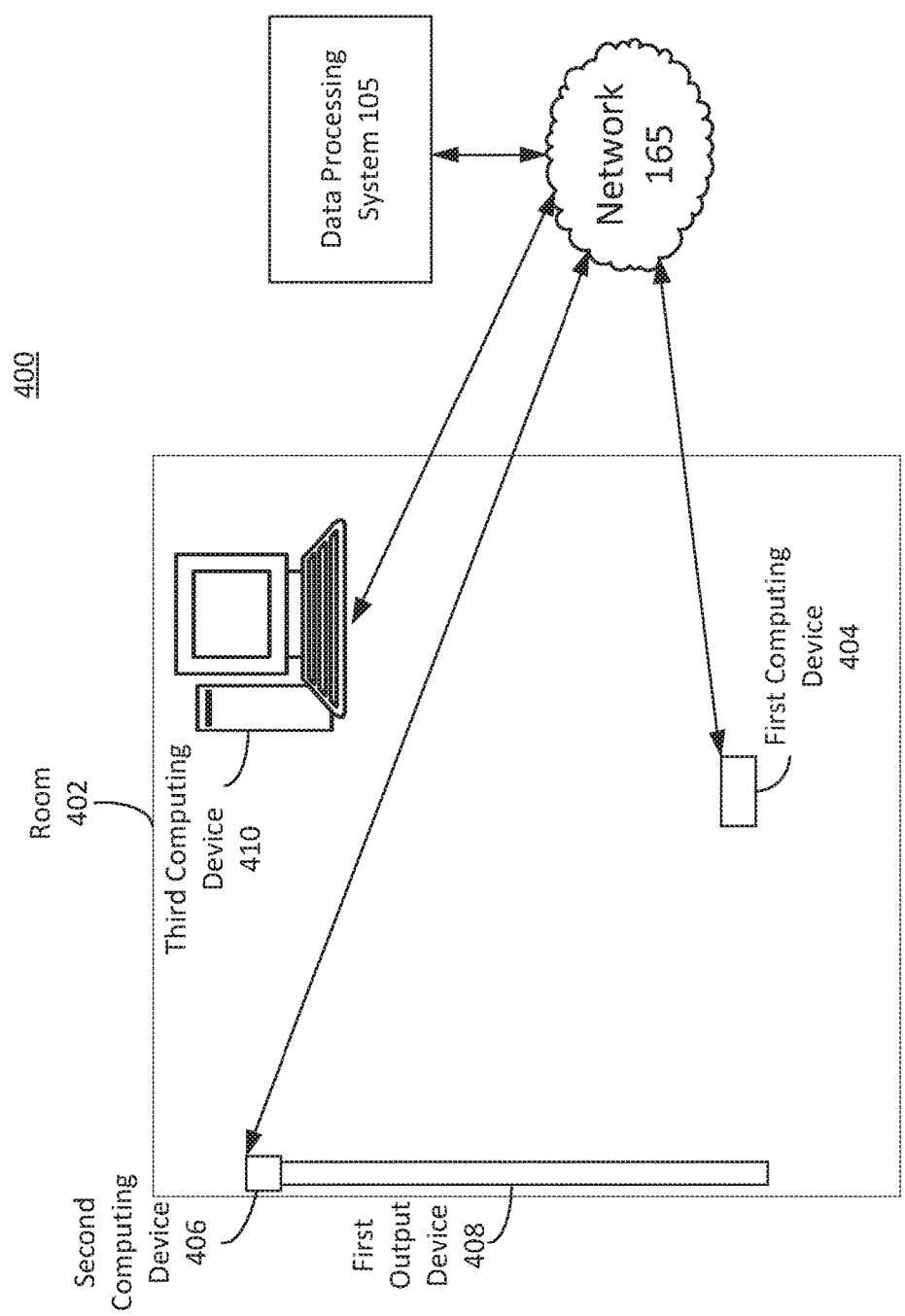
FIG. 4 depicts an operation of a system of multi-modal transmission of packetized data in a voice activated computer network environment.

FIG. 4 depicts an operation of a system of multi-modal transmission of packetized data in a voice activated computer network environment. The system 400 can include one or more component or functionality depicted in FIG. 1, FIG. 2, FIG. 3 or FIG. 5. For example, the system 400 can include the data processing system 105, network 165 and one or more computing devices 404, 406, and 408, and one or more output devices 408. The computing devices 404, 406 and 410 and output device 408 can be located in a room 402. The room 402 can refer to or include a physical room in a building, such as a house, apartment, condominium, office building, residential or commercial building. The room 402 can be, for example, a living room, family room, bedroom, office, restaurant, or retail location. The devices 406, 410 and 408 can be within a threshold distance of the computing device 404 because they are all located within a predetermined distance from the first computing device 404, or because the threshold distance corresponds to the devices being in the same room 402. For example, a profile for the account associated with the device 404 can indicate that the devices 406, 410 and 408 are also located in room 402. Thus, the data processing system 105 can determine, during polling for example, that the devices 410, 406 408 and 404 are all located in the same room 402.

The first computing device 404 can receive or detect an input voice query from a user. The input voice query can be, for example, "show me my day." The first computing device 404 can perform some initial pre-processing or parsing of the input voice query, and transmit the query to the data processing system 105 via network 165 for further processing. The data processing system 105 can process the query received from the first computing device 404 to generate one or more action data structures that are responsive to the single input query. The data processing system 105 can process the query received from the first computing device 404 to generate a first action data structure and a second action data structure that are both responsive to the single input query. The data processing system 105 can process the query received from the first computing device 404 to generate a first action data structure, select a first content item for the first action data structure, generate a second action data structure, and select a second content item that are all responsive to the single input query.

The data processing system 105 can then select to which interfaces or devices the one or more generated action data structures or selected content items are transmitted. The data processing system 105 can use a machine learning technique, historical data, or a map data structure to select the interfaces or devices.

For example, the data processing system 105 can transmit the first action data structure to the first computing device 404 (e.g., a smartphone or tablet) for presentation, and transmit the second action data structure to the second computing device 406 to cause the second computing device 406 (e.g., a digital assistant executing on a set top box or other device connected to a television display or other display) to present the second action data structure via the first output device 408 (e.g., a television display). The second computing device 406 can be communicatively coupled to the first output device 408 (e.g., via cable such as an HDMI cable or DVI cable or USB cable). The data processing system 105 can identify a third action data structure responsive to the input query to transmit to the third computing device 410 (e.g., a laptop or desktop computer). Thus, the data processing system 105 can select or override requested interfaces to transmit action data structure to optimize resource utilization of devices as well as improve the presentation of the digital or electronic content. The data processing system 105, by splitting an action data structure or a response to a query into multiple action data structure or multiple data components, can reduce the processor utilization or batter utilization by a single device and spread the resource utilization among multiple user devices, thereby improving the longevity of the single device. Further, by intelligently selecting multiple interfaces or devices to use based on a machine learning technique or map data structure or historical use, the data processing system 105 can improve the rendering or presentation of the action data structures or data components in a manner that prevents or avoids obfuscating the data by displaying multiple action data structures or components or content items on a single, smaller display.

FIG. 5 is a block diagram of an example computer system 500. The computer system or computing device 500 can include or be used to implement the system 100, 200 or 400, or its components such as the data processing system 105. The computing system 500 includes a bus 505 or other communication component for communicating information and a processor 510 or processing circuit coupled to the bus 505 for processing information. The computing system 500 can also include one or more processors 510 or processing circuits coupled to the bus for processing information. The computing system 500 also includes main memory 515, such as a random access memory (RAM) or other dynamic storage device, coupled to the bus 505 for storing information, and instructions to be executed by the processor 510. The main memory 515 can be or include the data repository 145. The main memory 515 can also be used for storing position information, temporary variables, or other intermediate information during execution of instructions by the processor 510. The computing system 500 may further include a read only memory (ROM) 520 or other static storage device coupled to the bus 505 for storing static information and instructions for the processor 510. A storage device 525, such as a solid state device, magnetic disk or optical disk, can be coupled to the bus 505 to persistently store information and instructions. The storage device 525 can include or be part of the data repository 145.

The computing system 500 may be coupled via the bus 505 to a display 535, such as a liquid crystal display, or active matrix display, for displaying information to a user. An input device 530, such as a keyboard including alphanumeric and other keys, may be coupled to the bus 505 for communicating information and command selections to the processor 510. The input device 530 can include a touch screen display 535. The input device 530 can also include a cursor control, such as a mouse, a trackball, or cursor direction keys, for communicating direction information and command selections to the processor 510 and for controlling cursor movement on the display 535. The display 535 can be part of the data processing system 105, the client computing device 150 or other component of FIG. 1, for example.

The processes, systems and methods described herein can be implemented by the computing system 500 in response to the processor 510 executing an arrangement of instructions contained in main memory 515. Such instructions can be read into main memory 515 from another computer-readable medium, such as the storage device 525. Execution of the arrangement of instructions contained in main memory 515 causes the computing system 500 to perform the illustrative processes described herein. One or more processors in a multi-processing arrangement may also be employed to execute the instructions contained in main memory 515. Hard-wired circuitry can be used in place of or in combination with software instructions together with the systems and methods described herein. Systems and methods described herein are not limited to any specific combination of hardware circuitry and software.

Although an example computing system has been described in FIG. 5, the subject matter including the operations described in this specification can be implemented in other types of digital electronic circuitry, or in computer software, firmware, or hardware, including the structures disclosed in this specification and their structural equivalents, or in combinations of one or more of them.

For situations in which the systems discussed herein collect personal information about users, or may make use of personal information, the users may be provided with an opportunity to control whether programs or features that may collect personal information (e.g., information about a user's social network, social actions or activities, a user's preferences, or a user's location), or to control whether or how to receive content from a content server or other data processing system that may be more relevant to the user. In addition, certain data may be anonymized in one or more ways before it is stored or used, so that personally identifiable information is removed when generating parameters. For example, a user's identity may be anonymized so that no personally identifiable information can be determined for the user, or a user's geographic location may be generalized where location information is obtained (such as to a city, postal code, or state level), so that a particular location of a user cannot be determined. Thus, the user may have control over how information is collected about him or her and used by the content server.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices). The operations described in this specification can be implemented as operations performed by a data processing apparatus on data stored on one or more computer-readable storage devices or received from other sources.

The terms "data processing system" "computing device" "component" or "data processing apparatus" encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures. The interface management component 140, direct action API 135, content selector component 125, prediction component 120 or NLP component 110 and other data processing system 105 components can include or share one or more data processing apparatuses, systems, computing devices, or processors.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs (e.g., components of the data processing system 105) to perform actions by operating on input data and generating output. The processes and logic flows can also be performed by, and apparatuses can also be implemented as, special purpose logic circuitry, e.g., an FPGA (field programmable gate array) or an ASIC (application-specific integrated circuit). Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The subject matter described herein can be implemented in a computing system that includes a back-end component, e.g., as a data server, or that includes a middleware component, e.g., an application server, or that includes a front-end component, e.g., a client computer having a graphical user interface or a web browser through which a user can interact with an implementation of the subject matter described in this specification, or a combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system such as system 100 or system 500 can include clients and servers. A client and server are generally remote from each other and typically interact through a communication network (e.g., the network 165). The relationship of client and server arises by virtue of computer programs running on the respective computers and having a client-server relationship to each other. In some implementations, a server transmits data (e.g., data packets representing action data structures or content items) to a client device (e.g., to the client computing device 150 for purposes of displaying data to and receiving user input from a user interacting with the client device, or to the service provider computing device 160 or the content provider computing device 155). Data generated at the client device (e.g., a result of the user interaction) can be received from the client device at the server (e.g., received by the data processing system 105 from the computing device 150 or the content provider computing device 155 or the service provider computing device 160).

While operations are depicted in the drawings in a particular order, such operations are not required to be performed in the particular order shown or in sequential order, and all illustrated operations are not required to be performed. Actions described herein can be performed in a different order.

The separation of various system components does not require separation in all implementations, and the described program components can be included in a single hardware or software product. For example, the NLP component 110, the content selector component 125, the interface management component 140, or the prediction component 120 can be a single component, app, or program, or a logic device having one or more processing circuits, or part of one or more servers of the data processing system 105.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. A system, comprising:
    a data processing system comprising memory and one or more processors to:
    receive data packets comprising voice input detected by a sensor of a computing device;
    parse the voice input to identify a keyword;
    select, based on the keyword, one or more content items;
    identify a first candidate interface and a second candidate interface associated with the computing device;
    select, based on a characteristic associated with the first candidate interface and the second candidate interface, the first candidate interface as a selected interface to present a first content item of the one or more content items; and
    transmit, to the computing device, the first content item for presentation via the selected interface in a modality compatible with the selected interface selected based on the characteristic.

2. The system of claim 1, comprising the data processing system to:
    generate, based on the keyword, one or more action data structures; and
    transmit a first action data structure in the modality compatible with the selected interface.

3. The system of claim 1, comprising the data processing system to:
    identify a request in the voice input;
    generate a first action data structure based on the request and the keyword; and
    select the first candidate interface based on the first action data structure.

4. The system of claim 3, comprising the data processing system to:
    select the first candidate interface based on at least one of a category or an output type of the first action data structure.

5. The system of claim 1, comprising the data processing system to:
    parse the voice input to identify the keyword and a request;
    generate a first action data structure based on the request and the keyword;
    select the one or more content items based on the request and the keyword; and
    provide the first action data structure and the first content item for delivery in the modality compatible with the selected interface selected based on the characteristic.

6. The system of claim 1, comprising:
    the data processing system to identify the first candidate interface and the second candidate interface located within a threshold distance of the computing device.

7. The system of claim 1, wherein the first candidate interface, the second candidate interface, and the computing device are linked with an account, comprising:
    the data processing system to identify the first candidate interface and the second candidate interface based on the first candidate interface and the second candidate interface being linked with the account.

8. The system of claim 1, comprising the data processing system to:
    poll a plurality of interfaces linked to an account of the computing device to identify a plurality of available interfaces, wherein the plurality of available interfaces comprises the first candidate interface and the second candidate interface.

9. The system of claim 1, comprising the data processing system to:
    identify a first characteristic associated with the first candidate interface, and a second characteristic associated with the second candidate interface; and
    select the first candidate interface based on the first characteristic.

10. The system of claim 1, comprising the data processing system to:
    determine a first resource utilization value for the first candidate interface and a second resource utilization value for the second candidate interface; and
    select, based on a comparison between the first resource utilization value and the second resource utilization value, the first candidate interface as the selected interface.

11. The system of claim 1, comprising:
    the data processing system to select the one or more content items via a real-time content selection process.

12. A method, comprising:
    receiving, by a data processing system comprising memory and one or more processors, data packets comprising voice input detected by a sensor of a computing device;
    parsing, by the data processing system, the voice input to identify a keyword;

selecting, by the data processing system based on the keyword, one or more content items;

identifying, by the data processing system, a first candidate interface and a second candidate interface associated with the computing device;

selecting, by the data processing system, based on a characteristic associated with the first candidate interface and the second candidate interface, the first candidate interface as a selected interface to present a first content item of the one or more content items; and transmitting, by the data processing system to the computing device, the first content item for presentation via the selected interface in a modality compatible with the selected interface selected based on the characteristic.

13. The method of claim 12, comprising:

generating, by the data processing system based on the keyword, one or more action data structures; and transmitting, by the data processing system, a first action data structure in the modality compatible with the selected interface.

14. The method of claim 12, comprising:

identifying, by the data processing system, a request in the voice input;

generating, by the data processing system, a first action data structure based on the request and the keyword; and selecting, by the data processing system, the first candidate interface based on the first action data structure.

15. The method of claim 14, comprising:

selecting, by the data processing system, the first candidate interface based on at least one of a category or an output type of the first action data structure.

16. The method of claim 12, comprising:

parsing, by the data processing system, the voice input to identify the keyword and a request;

generating, by the data processing system, a first action data structure based on the request and the keyword;

selecting, by the data processing system, the one or more content items based on the request and the keyword; and providing, by the data processing system, the first action data structure and the first content item for delivery in the modality compatible with the selected interface selected based on the characteristic.

17. The method of claim 12, comprising:

identifying, by the data processing system, the first candidate interface and the second candidate interface located within a threshold distance of the computing device.

18. The method of claim 12, wherein the first candidate interface, the second candidate interface, and the computing device are linked with an account, comprising:

identifying, by the data processing system, the first candidate interface and the second candidate interface based on the first candidate interface and the second candidate interface being linked with the account.

19. The method of claim 12, comprising:

polling, by the data processing system, a plurality of interfaces linked to an account of the computing device to identify a plurality of available interfaces, wherein the plurality of available interfaces comprises the first candidate interface and the second candidate interface.

20. The method of claim 12, comprising:

determining, by the data processing system, a first resource utilization value for the first candidate interface and a second resource utilization value for the second candidate interface; and selecting, by the data processing system, based on a comparison between the first resource utilization value and the second resource utilization value, the first candidate interface as the selected interface.

* * * * *